(12) United States Patent
Clark et al.

(10) Patent No.: US 8,352,281 B2
(45) Date of Patent: *Jan. 8, 2013

(54) SYSTEM, METHOD AND COMPUTER PROGRAM PRODUCT FOR ASSESSING RISK OF IDENTITY THEFT

(75) Inventors: Robert T. Clark, Somerset, WI (US); Adam Elliott, Lino Lakes, MN (US)

(73) Assignee: ID Insight Incorporated, Arden Hills, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/758,171

(22) Filed: Apr. 12, 2010

(65) Prior Publication Data

US 2011/0066547 A1 Mar. 17, 2011

Related U.S. Application Data

(63) Continuation of application No. 10/697,076, filed on Oct. 30, 2003, now Pat. No. 7,870,078.

(60) Provisional application No. 60/423,298, filed on Nov. 1, 2002.

(51) Int. Cl.
*G06Q 10/00* (2012.01)
(52) U.S. Cl. ........................................ 705/1.1
(58) Field of Classification Search .................. None
See application file for complete search history.

(56) References Cited

U.S. PATENT DOCUMENTS

| | | | |
|---|---|---|---|
| 6,418,436 B1 * | 7/2002 | Degen et al. ......................... 1/1 |
| 7,337,119 B1 * | 2/2008 | Geschwender et al. ........ 705/44 |
| 2002/0099649 A1 * | 7/2002 | Lee et al. ........................ 705/38 |
| 2003/0225692 A1 * | 12/2003 | Bosch et al. .................... 705/42 |

OTHER PUBLICATIONS

Homeland Security Identicate; http://www.ams.com/HomelandSecurity/Identicate_func.asp (Sep. 26, 2002).
Homeland Security Identicate; http://www.ams.com/HomelandSecurity/Identicate.asp (Sep. 26, 2002).
*AMS and DAC Services Partner to Provide Comprehensive Identity Authentication & Screening for US Transportation Industry* as published on http://www.ams.com (Sep. 26, 2002).
AMS Identicate; http://www.ams.com/financialservices/creditservices/identicate.com (Jan. 8, 2004).
Donnelly Marketing; http://www.donnelleymarketing.com (Jan. 8, 2004).
LexisNexis RiskWise; http://www.riskwise.com/fraudpoint.html (Jan. 19, 2004).
Primary Payment Systems; http://www.primarypayments.com (Jan. 8, 2004).
Belsie, Laurent, Latest Scam Threatens Cred-Card User Security, Feb. 8, 1996; The Oregonian, Living p. C03, pp. 1-2.

(Continued)

*Primary Examiner* — Jonathan Ouellette
(74) *Attorney, Agent, or Firm* — Winthrop & Weinstine, P.A.

(57) ABSTRACT

In one embodiment, this invention analyzes demographic data that is associated with a specific street address when presented as an address change on an existing account or an address included on a new account application when that address is different from the reference address (e.g., a credit bureau type header data). The old or reference address and the new address, the new account application address or fulfillment address demographic attributes are gathered, analyzed, compared for divergence and scaled to reflect the relative fraud risk.

33 Claims, 15 Drawing Sheets

OTHER PUBLICATIONS

Fair, Issac's Fusion Technology Improves Credit Card Fraud Detection at Total System Services, Inc.; Powerful, Next Generation Fraud Models Offer Unprecedented Predictive Power, Feb. 22, 1999, PR Newswire, Financial News, pp. 1-2.

Mom and Pop Operation Focuses on Fraud, Apr. 22, 1996, Credit Risk Management Report, p. 1, pp. 1-2.

* cited by examiner

*Power of Segmentation*

ND computer

SYSTEM, METHOD AND COMPUTER PROGRAM PRODUCT FOR ASSESSING RISK OF IDENTITY THEFT

CROSS-REFERENCE TO RELATED APPLICATION(S)

This application is a continuation of U.S. patent application Ser. No. 10/679,076, filed on Oct. 30, 2003, which claims priority to U.S. Provisional Patent Application No. 60/423,298, filed on Nov. 1, 2002, the entire contents of both of which are incorporated herein by reference.

TECHNICAL FIELD

This invention relates, in general, to apparatuses and methods for identifying account fraud. In particular, this invention relates to detecting fraud and assisting in fraud prevention due to identity theft including to but not limited to address change, account takeover fraud, and new account application fraud. In addition, this invention may be practiced using batch or real-time, online processing or using customer hosted software applications.

BACKGROUND OF THE INVENTION

Numerous businesses, such as financial institutions, department stores, fulfillment businesses, on-line business, and businesses making sales over the telephone face the challenge of protecting the business from customers attempting to defraud it. These businesses regularly handle thousands of accounts from its users or consumers. Such accounts may include instant credit or credit accounts with a department store or other retail outlet, or accounts involving checks, credit cards, debit cards, or ATM cards of a bank, credit or other financial institution.

Identity theft may include account takeover, wherein a thief steals the identity of an individual and then uses that information to take over ownership of that individual's account; or new account fraud, wherein the identity thief uses stolen information to open new accounts in another person's name.

Conventional methods for detecting identity theft when opening new accounts or for modifying existing accounts may be problematic. Currently, to detect identity theft type fraud, businesses have used negative databases of suspicious addresses like mail receiving agents or known fraud addresses. This method is useful only if there is known negative information. Often, delivery addresses are not included in a negative database.

In the case of new account application fraud, contemporary detection methods focus on the verification of data elements that are ascertainable by the criminal. These approaches seek to verify the identity of the new account applicant based on the information that is provided in the application process. There are typically three methodologies used in the new account verification process. First, businesses check negative file resources to see whether there is negative information associated with a data element e.g., the provided social security number belongs to a deceased person. Second, businesses attempt to verify the applicant's identity through the use of matching those application data elements to independent data sources which often only serve to corroborate the stolen information that the crook is using. Third, there are logical references like; does the driver's license number fit the format from the issuing state? These techniques are generally used for both "in and out of wallet solutions." "Out of Wallet" verification adds a level of complexity to the criminal enterprise through the presentation questions based on data not typically stored in a wallet or purse. For instance, asking a person to provide a the maiden name of his/her mother.

As recognized by the present inventors, what is needed is a system, method, and computer program product for detecting identity fraud theft using a method that may either supplant or complement some of the methods discussed above. There is a further need for a system, method and computer program that identifies both account takeover identity theft and new account identity theft.

SUMMARY OF THE INVENTION

In light of the above and according to one broad aspect of one embodiment of the invention, disclosed herein is a system and methods for detecting fraud in account requests such as requests for new accounts, requests for change of address of existing accounts, and requests for media such as bank checks, duplicate credits cards, ATM cards, debit cards, past financial statements, and the like. In one example, embodiments of the present invention may utilize demographic data based on addresses associated with the account to determine whether an account request may involve identity theft fraud, and scores may be generated indicating the likelihood that the account request may involve identity theft fraud.

In one embodiment, this invention analyzes demographic data that is associated with a specific street address when presented as an address change on an existing account or an address included on a new account application when that address is different from the reference address (e.g., a credit bureau type header data). The old or reference address and the new address, the new account application address or fulfillment address demographic attributes are gathered, analyzed, compared for divergence and scaled to reflect the relative fraud risk.

Another embodiment of the present invention relates to a method for assessing a risk of fraud. The method comprises receiving at least information relating to a first address relating to one of an account holder or an applicant; receiving information relating to a second address; and measuring demographic differences between the first and second addresses.

Another embodiment of the present invention relates to a method for assessing a risk of identity theft fraud with respect to new applications. The method comprises receiving first address information relating to an applicant for an account; and using demographic data relating to the address information.

Another embodiment of the present invention relates to a method for detecting a risk of identity theft fraud. The method comprises combining warm address, known fraud address information, USPS Deliverable Address File, NCOA files with address specific, single point, demographic information; and coupling differential information relating to the addresses to predict a risk of fraud for at least one of account takeover new account application and fulfillment fraud.

Another embodiment of the present invention relates to a system for assessing a risk of fraud. The system includes a processor, memory; computer instructions operable by the processor to append data to at least one variable used in assessing a risk of identity theft fraud; computer instructions operable by the processor to analyze differences in demographic data for two different street address; computer instructions operable by the processor to calculate a score indicative of a level of risk of fraud; and computer instructions operable by the processor to output an assessment of a risk of level of fraud. In calculating the score, the formula used is of the form:

$$Y = A + B1*x1 + B2*x2 + B3*x3 \ldots + Bn*xn$$

where Y is the dependent or outcome variable is the result used to predict the risk of identity theft fraud, A is a constant value, B1 . . . Bn are the coefficients or weights assigned to the independent variables, and x1 . . . xn are the independent variables.

DETAILED DESCRIPTION

The present invention generally relates to a system and method for detecting or assessing the risk of identity theft fraud. The present invention will be described in the context of detecting or assessing the risk of identity theft fraud in two contexts: new account application fraud and account takeover fraud. However, the present invention is not limited to only detecting these type of fraud schemes.

Figure 1:
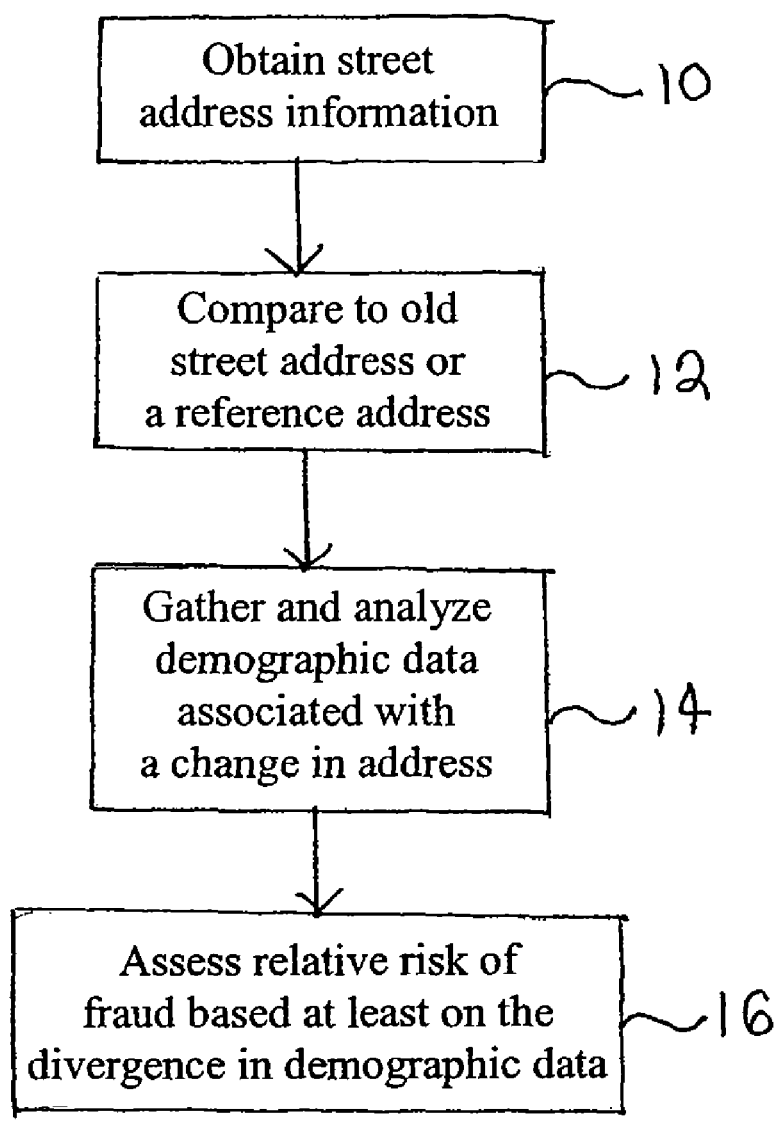
FIG. 1 is a block diagram of an overall process in accordance with an embodiment of the present invention.

FIG. 1 shows the general steps used in an embodiment of the present invention for detecting fraud. As shown in block 10, new address information is obtained. In the context of a new account application, this may be the address provided on the application and in the context of takeover of an account, this may be the new address provided that is to replace the current address on the account. As shown in block 12, this new street address information is compared to a reference address (which may be an address obtained from a credit report for the person or the current address prior to the change of address). Next, as shown in block 14, demographic data associated with the addresses is gathered and analyzed. As shown in block 16, an assessment of relative risk of identity theft fraud is made based on the analysis. As such, the present invention analyzes demographic data that is associated with a specific street address when presented as an address change on an existing account or an address included on a new account application when that address is different from a reference address (e.g., whether provided by the applicant or obtained from a credit bureau). For the two addresses, demographic attributes are gathered, analyzed, compared for divergence and scaled to reflect the relative risk of identity theft fraud. Risk may be expressed in a number of ways. In one embodiment, risk is expressed as an upper bound numerical score from 1 to 100 that is returned with reason codes to the customer for follow up.

One advantage to the present invention's use of address information is that an address is the one element that a criminal cannot manipulate. That is, when a criminal steals an identity, the criminal may be able to obtain identity information relating to the victim. However, the criminal cannot receive mail at the victim's house. Consequently, the criminal needs to use an address where he/she can receive mail (e.g., to obtain media or goods). As such, the present invention compares addresses. The present invention recognizes that there are demographic differences between addresses. For instance, one address may have an upscale socio-economic demographic as compared to the other address that has a more downscale socio-economic demographic. By using street address information as the basis for gathering, comparing and analyzing demographic data, the present invention uses elements that can be independently verified and analyzed to determine a risk of identity theft. Also, in addition to the demographic data, additional data elements such as warm address information or undeliverable address information may be used to assist in assessing the risk of identity theft fraud. Within the context of this document, "Account" as used in this application includes its ordinary meaning and is also intended to cover any business relationship where there is financial risk on part of the product or service provider including but not limited to relationships of credit, debit brokerage, retail, non-face to face fulfillment activities (e.g., on-line sales).

In general, the risk assessment is performed when a business or service user sends/transmits the old or reference address and the new (requested changed) or new account application address with other identifying information for use by the software application embodying the present invention. Input data is matched to address specific demographic data which in turn is delivered to the decision engine to produce a risk score. Data processing can occur in batch, real time online or on customer or processor hosted software application. Communications can occur through telephone, data line, internet or tape/disk or other commercially available method. The application output may be returned to the service user via an internet accessed system, telephone, data line, or other commercially available method.

In general, the present invention uses statistical modeling of negative and demographic/socio-economic data elements associated with a street address to identify suspected identity theft fraud activity when there is a change in address or an address on a new application that is different from a reference address (e.g., one provided by the applicant or one obtained from a third party such as a credit bureau). As such, this invention may be used to detect identity theft fraud in existing accounts, new credit account applications or other business risks associated with address manipulation. The process generally analyzes the differences in demographic data between an old address or reference address and an address on a new application or an address change on an account to a new address. If a reference address is not provided by the new applicant or is not the address that was changed to a new address, then a reference address may be a credit bureau header data or an address secured from a third party database. Additionally, other negative and logical data sources are used in the risk evaluation, such as warm address information, driver's license syntax specific to a state, or the year a social security number is issued is compared to the date of birth for rationality. Analysis may performed through the use of regression models, neural network and expert rules based technology. A score that scales risk is developed to identify the likelihood of identity theft fraud. The score is returned along with supportive investigative data to the customer/business for use in determining the level of risk it is willing to take in entering into a business relationship with the investigated person. Consequently, an embodiment of the present invention provides businesses with the opportunity investigate a potential identity theft fraud and take steps to prevent economic loss. As will be discussed, in the preferred embodiment, the present invention is implemented in software.

Figure 2:
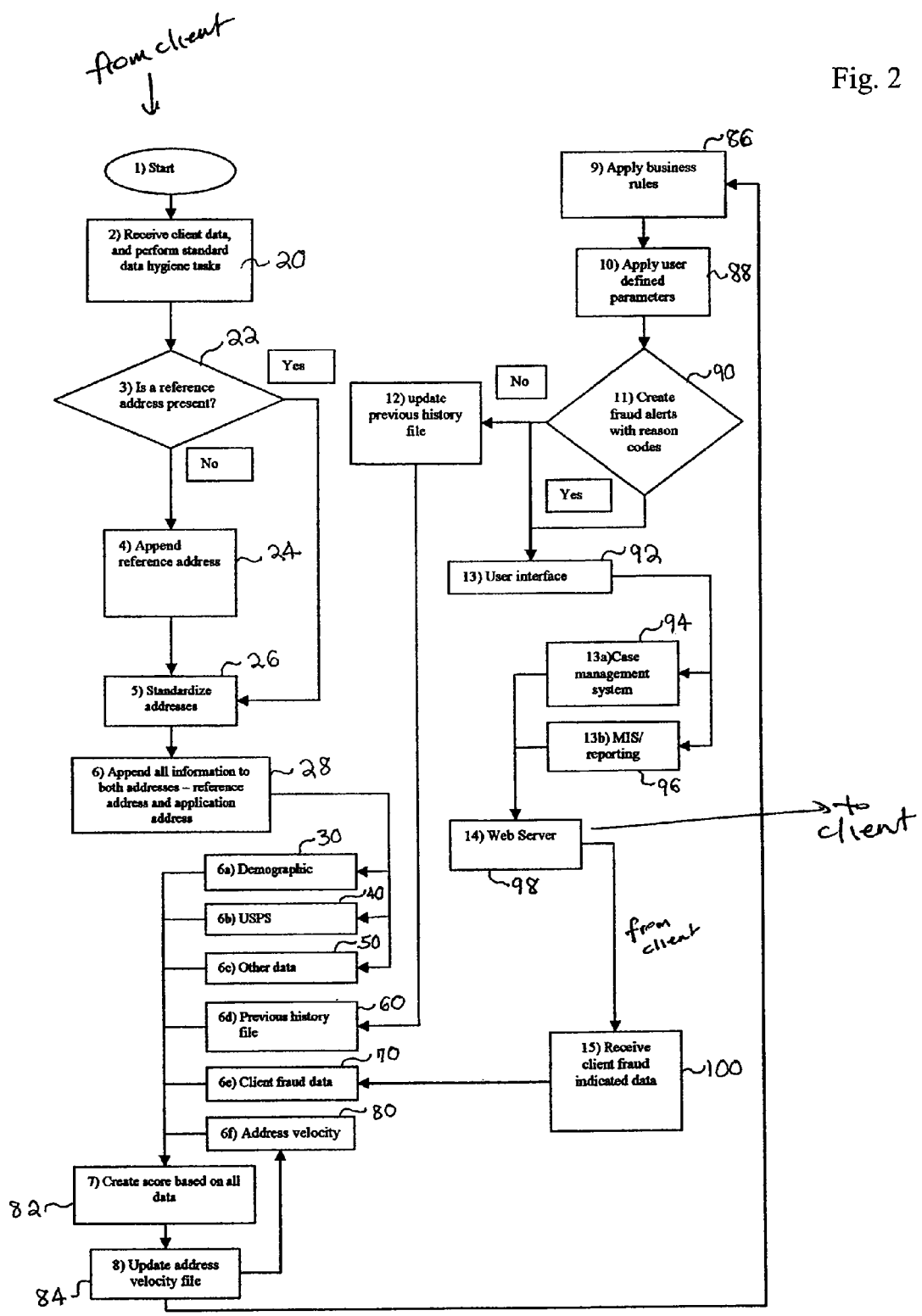
FIG. 2 illustrates an example of logical operations for processing new account requests, in accordance with an embodiment of the present invention.

Referring to FIG. 2, the method for detecting new account application fraud will be described. FIG. 2 illustrates an example of logical operations for detecting fraud in the context of receiving a new account request. As shown in block 20, a new request is received including the client data, and the received data is reformatted, normalized, or otherwise processed so that the data can be further processed. An input data stream or data inputs from the client/customer are delivered to the host system for processing. Examples of the type of message elements or data inputs include the following:

| New Account Application/Address Change (New Address) data inputs | |
| --- | --- |
| Customer identifier | First name |
| Transaction type | Middle initial/name |
| Street directional | Last name |
| Street name | Surname |
| Unit number | Account or reference number |
| City name | Address type code |
| State Name | Social Security Number |
| Zip Code plus 4 | Date of Birth |
| Driver's license information | Loss potential - for takeover only |

| New Account Reference Address/Address Change Old Address | |
| --- | --- |
| Customer identifier | First name |
| Transaction type | Middle initial/name |
| Street directional | Last name |
| Street name | Surname |
| Unit number | Account or reference number |
| City name | Address type code |
| State name | Social Security Number |
| Zip Code plus 4 | Date of Birth |
| Driver's license information | |

| Account Access Device Requests, Normal or Emergency (Credit/Debit Cards, Checks, PIN) requests input file (Address change process only) | |
| --- | --- |
| Transaction type | State name |
| Media type | Zip Code plus 4 |
| Request type | First name |
| Account number | Middle initial/name |
| Street directional | Last name |
| Street name | Surname |
| Unit number | Address type code |
| City name | Loss potential - Open to buy/balance |
| | Driver's license information |

However, depending on the implementation, not all of the data elements need to be sent by the client. In one embodiment, for assessing risk of new account application identity theft fraud, input data includes name and address listed on the new application. In one embodiment, for assessing risk of account takeover identity theft fraud, input data includes name, current address or reference address, and the address to which it was changed.

In general, information that may be provided by a business that wants an assessment of risk of identity theft may provide the type of transaction (e.g., new application, change of address, etc.), information to identify the person that is to be investigated (e.g., name, social security number, date of birth etc.), address information as will be discussed with reference to FIG. 3, account information, and whether there has been a media request (e.g., a request for checks, credit cards, PIN number, or other items of value).

Figure 3:
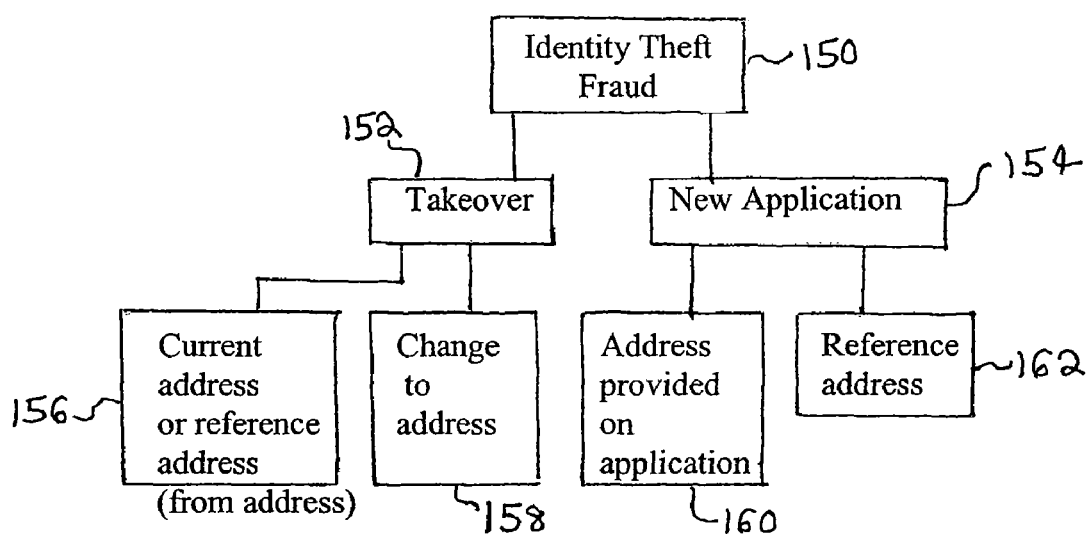
FIG. 3 is a block diagram showing the address information used in an embodiment of the present invention to detect identity theft via account takeover or via applications for new accounts.
Figure 4:
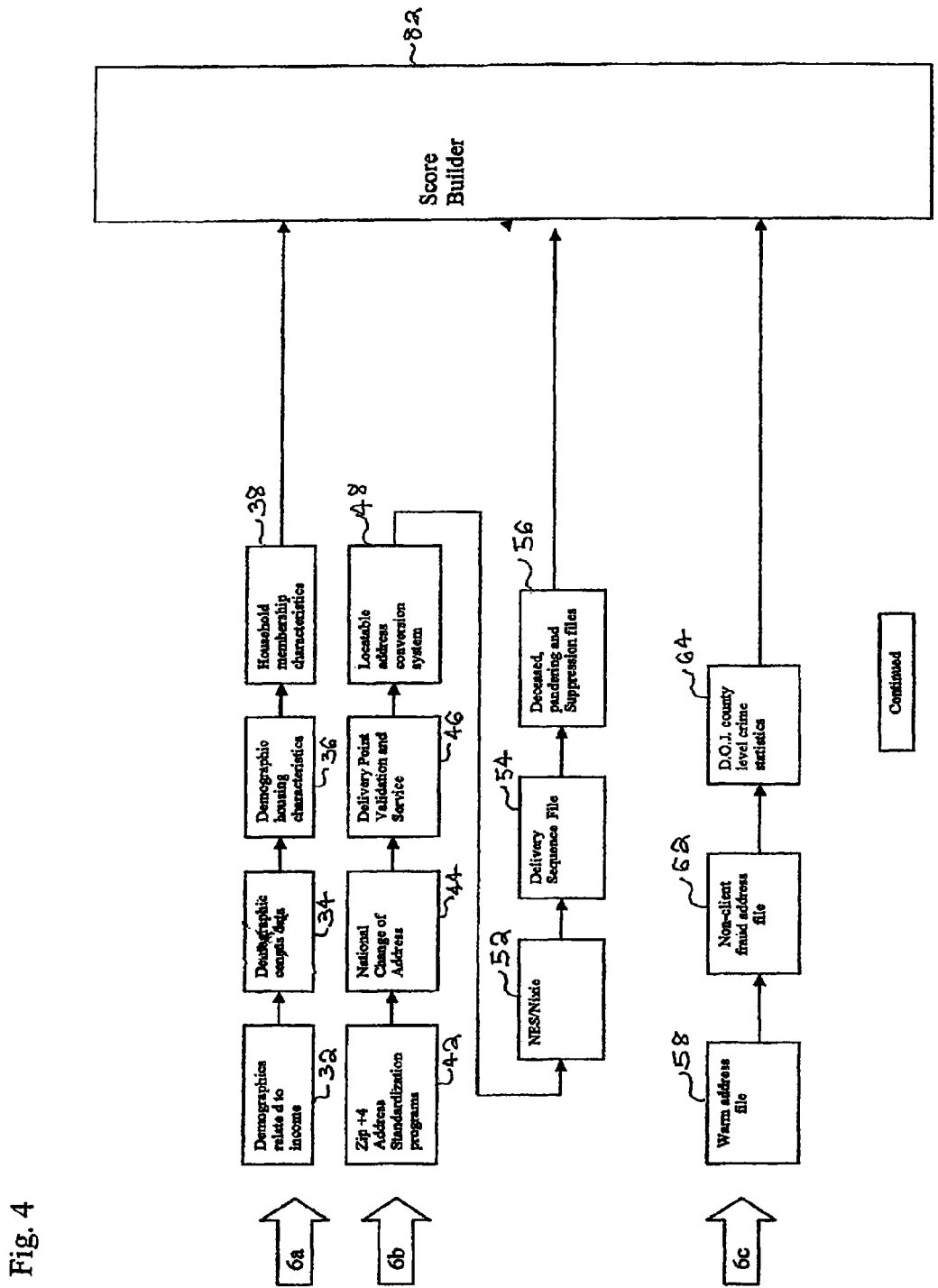
FIGS. 4-5 illustrate examples of logical operations for processing new account requests as illustrated in FIG. 2, in accordance with an embodiment of the present invention.

FIG. 3 is a block diagram showing two forms of identity theft fraud (block 150): takeover identity theft fraud (block 152) and new application identity theft fraud (block 154). In general, account takeover occurs when a person (e.g., a criminal) poses as the customer of a business and changes the address from the customers' address to the another address (i.e., the criminal's address). The criminal then had media, such as checks, credit cards, PIN number, or other items of value (including other goods) to the new/criminal address. The criminal then may commit fraud from the unauthorized use of the financial instrument or benefits from the illegally obtained goods. New application identity theft fraud involves a criminal submitting a new application that includes information of another and attempts to obtain media or other goods and services from the business.

In the account take over situation, usually there is an address change to a new address. The current address prior to the address change may be referred to as the old address, the reference address, or the FROM address. The new address (i.e., the address that the reference address was changed to) is sometimes referred to as the TO address. Similarly, in the new application situation, the reference address is the old address or FROM address. It may be provided by the applicant or it may be obtained from a third party such as a credit bureau. Also, in the new application, address provided on the new application may be referred to as the new address or TO address.

Usually in the takeover situation, because of the address change, the business that is going to have an assessment made of the risk of identity theft fraud has an old address or reference address and a new address. In the new application situation, usually, a business that is going to have assessment made will have the address stated on the application but may not have a reference address. It is more common to use a third party source to obtain a reference address for analysis of a risk of identity theft in a new application situation. However, the present invention may be used when, in a new application situation, a reference address is provided by the business that wants to analyze the applicant for identity theft fraud. Some of the information provided by the business in requesting an analysis for the risk of identity theft is to provide other information such as a social security number to assist in obtaining information a reference address for the person named on the application from a third party source.

An embodiment of the present invention uses an input data stream from the client/customer in a processing scenario or delivers required data inputs to the customer hosted software application. As shown above, data inputs for account takeover may include a customer name, account number and the old or FROM address, and new or TO address. As shown above, new account application input data may include name, institutional reference number, reference address and application addresses. If the reference address is not available, a third party address database will be consulted. Emergency "Over night" replacement" processing inputs may include name, address, account or reference number, account type and open to buy/available credit balance.

As will be described, input data is compared against the warm address, known fraud data, USPS deliverable Address File and the NCOA files. The outcomes of these comparisons are appended to the inquiry record. The inquiry is then matched to the demographic data file and appended to the inquiry record. The inquiry record is written to the inquiry log.

At block 22, a determination is made as to whether a reference address is present. If a reference address is provided in the client data, then such address is also standardized (block 26). Otherwise a reference address is appended to the data received (block 24). If the reference address is not available, a third party address database may be consulted. For instance, the reference address may be obtained from a credit bureau and appended to the data received. Then, the appended reference address is standardized (block 26)

In one embodiment, if the reference address and the new account application address are the same the inquiry will be logged to an inquiry database and no further action will be taken. In another embodiment, if the reference address and the new account application address are the same, the inquiry will be logged to an inquiry database and the address will be checked to make sure it is not a warm address or that it is not an undeliverable address. Also, when the address on a new application matches the reference address, then the business may not want the analysis conducted.

If there is a difference between the new account application address and the reference address, then additional information such as the information that will be described with respect to blocks 30, 40, 50, 60, 70, and 80 will be appended to both addresses (block 28). All information is appended to both the reference address and to the address provided in the application (block 28). In one embodiment, the information appended includes demographic data (block 30), U.S. postal service data (block 40), other data (50), previous history file data (block 60), client fraud data (block 70) received from a particular client, and address velocity data (block 80).

Figure 6:
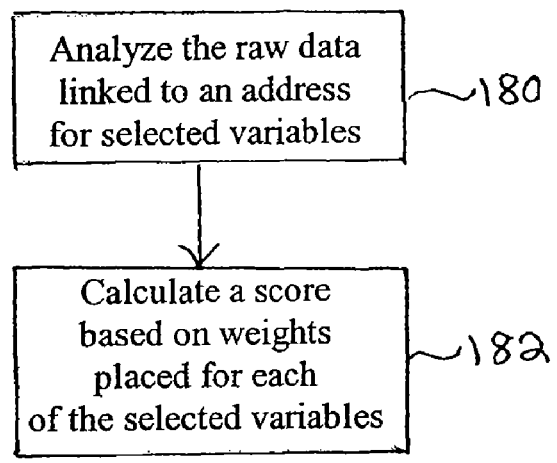
FIG. 6a illustrates an example of the logical operations for determining a risk of identity theft fraud, in accordance with an embodiment of the present invention.
FIG. 6b is a block diagram showing logical operations for appending certain information to addresses in performing analysis for determining a risk of identity theft fraud, in accordance with an embodiment of the present invention.
Figure 7:
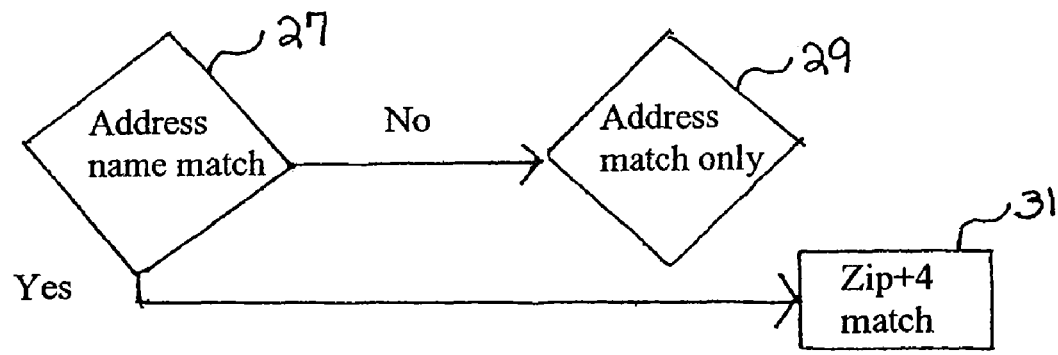
FIG. 7 illustrates a Power of Sementation summary chart.
Figure 6B:
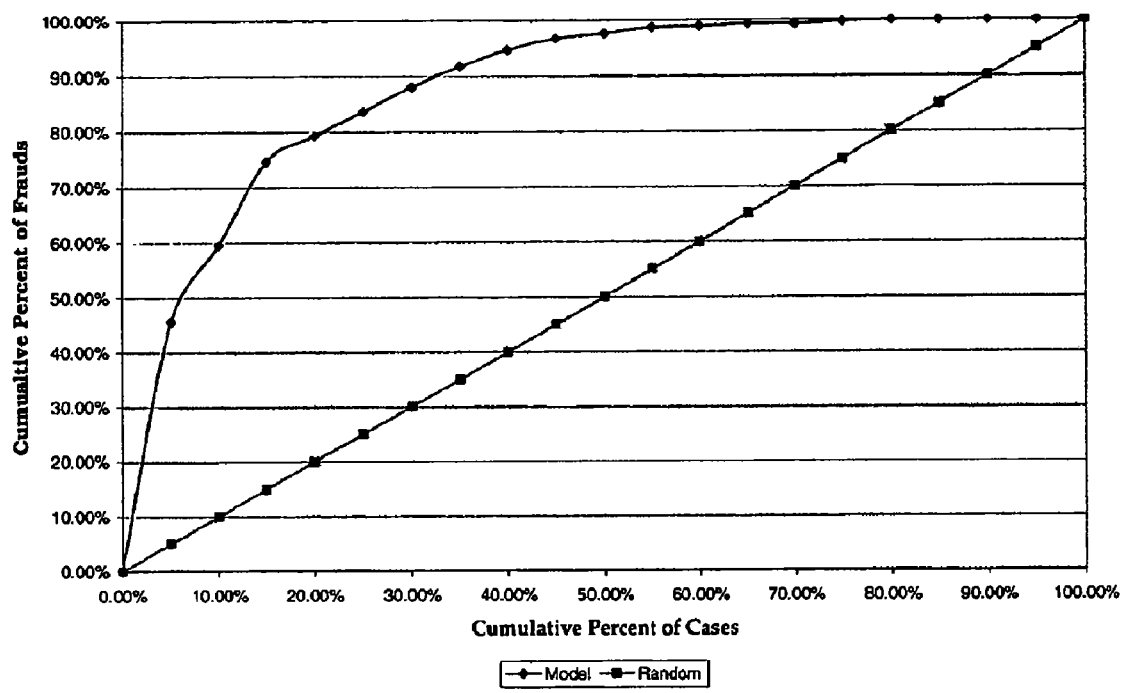

With respect to FIG. 6b, a brief description of the logical operations performed in determining the data appended from demographic data (block 30). In selecting demographic data to append to an address, first an attempt is made to match the name and address (block 27). If there is a match, then the demographic data is the appended from that file. However, if there is not a match for both name and address, then there is an attempt made to match the address. If a match is made, then the demographic data for the address is appended. Also, for the area defined by a Zip+4 or Zip code +4, a demographic data for that area is appended. For instance, if information related to length of residence was being appended to each address, then first, a search would be made to match the name and address to the file containing such information. If a match is made, the length of residence data from that file would be appended. If such a match is not made, then an attempt would be made to match the address only. If there is a match, then the length of residence for the last person at the address would be appended. Also, the length of residence for the residences in the Zip+4 would be appended (or an average of the length of residences for the residences in the Zip+4 would be appended).

Demographic data may come from a number of national databases. Such data is compiled by companies such as Experian, Equifax, InfoUSA, and Acxiom. These databases include publicly available demographic data from sources such as vehicle registration data, county assessor information, warranty cards, and department of motor vehicle data among other sources. These databases may be accessed to obtain demographic data information. As shown in FIG. 3, demographic data appended to the addresses as shown in block 30 may include appending demographic data related to income (block 32), demographic census data (block 34), demographic data relating to housing characteristics (block 36) and data relating to household membership characteristics. Example of such data include:

| Census/demographic data for reference/application/change address | |
|---|---|
| Address type - residence, single family apartment, business | Household income |
| | Length of residence |
| Owner/renter | Number of children |
| Single family/renter | Deliverable address |
| Primary and secondary names | Longitude/latitude |
| Age, primary and secondary | Neighbor wealth |
| Gender, primary and secondary | Single family dwelling value |
| Occupation, primary and secondary | Relocation velocity |
| Marital status | Education |
| Number of adults | Vehicles |

Further examples of demographic data related to income include:
    RESEARCH—INCOME ESTIMATES
    EXPENDABLE INCOME RANK
    NET WORTH RANK
    WEALTHFINDER CODE
    POTENTIAL INVESTOR CONSUMER SCORE
    REVOLVER MINIMUM PAYMENT MODEL
    BUYER BEHAVIOR CLUSTER CODE
    INTERNET USAGE MODEL
    HIGH TECH HOUSEHOLD INDICATOR
    HOUSEHOLD OWNS STOCKS OR BONDS
Examples of demographic data related to housing characteristics include:
    LIKELIHOOD HOME IS OWNED OR RENTED
    DELIVERY UNIT SIZE
    HOMEOWNER INDICATOR
    AGE OF HOME SOURCE CODE
    AGE OF HOME
    ESTIMATED HOME VALUE CODE
    LOAN-TO-VALUE RATIO RANGE CODE
    HOME LOAN AMOUNT
    MORTGAGE AMOUNT SOURCE CODE
    MORTGAGE BALANCE CODE
    HOME EQUITY ESTIMATE
    HOMEOWNER SOURCE CODE HOUSEHOLD HAS MOVED FROM ADDRESS
RESEARCH—ADDRESS VERIFICATION
ADDRESS VERIFIED BY ANY DICTIONARY
PRIMARY SOURCE OF NAME AND ADDRESS
RESEARCH—SOURCE FLAGS/RECENCY
DATE
LENGTH OF RESIDENCE IN YEARS.

Examples of demographic data related to household membership characteristics include:
HEAD OF HOUSEHOLD AGE CODE
HOUSEHOLD MEMBER 1 GENDER CODE
HOUSEHOLD MEMBER 1 TITLE CODE
HOUSEHOLD MEMBER 1 GIVEN NAME
HOUSEHOLD MEMBER 1 MIDDLE INITIAL
HOUSEHOLD MEMBER 1 SURNAME
HOUSEHOLD MEMBER 1 SURNAME SUFFIX Also, the similar information about other members of the household may be included.

Similarly, as shown in FIG. 3, United States Postal Service data appended to each address as shown in block 40 may include application of Zip code+4 address standardization programs (block 42), national change of address (block 44), delivery point validation and service (block 46), locatable address conversion system (block 48), NES/Nixie (block 52), delivery sequence file (block 54), and deceased, pandering and suppression files (block 56). The deliverable address file and the national change of address file are searched to match the address. Examples of the delivery validation file and the national change of address file is as follows:

| U.S. Postal Service Deliverable Address File | |
| --- | --- |
| Street number | Unit number |
| Street directional | City name |
| Street name | State Name |
| Zip Code plus 4 | |

| National Change of Address - USPS | |
| --- | --- |
| Street number | Unit number |
| Street directional | City name |
| Street name | State Name |
| Zip Code plus 4 | Confirmed change of address by USPS |
| | Move date |

The following additional information may be gathered from the United States Postal Service data:
STREET DESIGNATOR
POST DIRECTION
UNIT TYPE
UNIT NUMBER
ZIP CODE
ZIP+4 CODE
DELIVERY POINT AND CHECK DIGIT
CARRIER ROUTE
ZIP+4 MATCH LEVEL
PRIMARY NUMBER IS A BOX
ZIP CODE STANDARDIZATION
CITY CHANGE INDICATOR
LOT
STATE CODE
COUNTY CODE
LACS INDICATOR
FINALIST UNIT RETURN CODE
VENDOR SOURCE
CITY TYPE INDICATOR
RECORD TYPE FROM ZIP+4 FILE
Appendage
LEVEL
MOVE TYPE
EFFECTIVE MOVE DATA (YYYYMM)
UNIT TYPE
UNIT NUMBER
CITY NAME
STATE ABBREVIATION
ZIP CODE
ZIP+4 ADD-ON CODE
DELIVERY POINT AND CHECK DIGIT
CARRIER ROUTE
ZIP+4 MATCH LEVEL
PRIMARY NUMBER IS A BOX
LACS RECORD TYPE
MULTI SOURCE LEVEL
NCOA MATCH FOOTNOTES
INDIVIDUAL MATCH LOGIC REQUIRED
NIXIE MATCH
HOUSE NUMBER MISSING
CLIENT RECORD MISSING BOX
ADDRESSES DO NOT MATCH
STREET NAME DOES NOT MATCH
UNIT NUMBER MISSING IN CLIENT
UNIT NUMBER TRANSPOSITION
UNIT NUMBER MISMATCH
CLIENT MISSING $1^{ST}$ NAME
$1^{ST}$ NAME MATCHES $1^{ST}$ INITIAL
MIDDLE NAME/INITIAL MISMATCH
GENDER MISMATCH
TITLE/SUFFIXES DO NOT MATCH
INDIVIDUAL MOVE AND $1^{ST}$ NAMES DO NOT MATCH
INDIVIDUAL MATCH LOGIC AND $1^{ST}$ NAMES DO NOT MATCH
SURNAME MATCH TO GEN. DELIVERY
Appendage
MATCHED TO ZIP+4 FILE
NOT MATCHED TO ZIP+4 FILE
ALL COMPONENTS MATCHED TO DPV
DPV MATCHED BUT SECONDARY NUMBER INVALID
DPV MATCHED HIGHRISE DEFAULT
(MISSING SECONDARY
PRIMARY NUMBER MISSING
PRIMARY NUMBER INVALID
MISSING PO, RR, HC BOX NUMBER
MATCHED TO CMRA AND PMB,
DESIGNATOR PRESENT
MATCHED TO CMRA AND PMB,
Designator not Present
DPV CONFIRMATION INDICTOR
INVALID ADDRESS PO, RR, OR HC
BOX NUMBER INVALID
FUTURE EXPANSION
ZIP+4 MATCH LEVEL
ADDRESS SORT SEQUENCE NUMBER
VACANT INDICATOR
SEASONAL INDICATOR
RESIDENTIAL/BUSINESS INDICATOR
THROWBACK INDICATOR
DELIVERY TYPE CODE
DELIVERY POINT DROP INDICATOR
NUMBER OF DELIVERIES AT THE DROP
LOCATION ADDRESS CONVERSION
INDICATOR NO STATISTICS INDICATOR
Appendage
ADDRESS SOURCE CODE
ADDRESS DELIVERY CODES
PANDER CODE
LOCAL ADDRESS LINE
UNIT INFORMATION LINE
SECONDARY ADDRESS LINE/URBANIZATION
CODE
LONG CITY NAME
ZIP CODE
ZIP+4 CODE
MAILABILITY CODE
MILITARY ZIP CODE
OPAC MATCH INDICATOR
NDI AFFIRMED APT INDICATOR
SECONDARY ADDRESS INDICATOR
POSTAL COUNTY CODE
LONG CITY NAME INDICATOR
CARRIER ROUTE CODE
LINE OF TRAVEL INFORMATION
LOT SORTATION NUMBER
PRESTIGE CITY NAME USED
ZIP/ADD-ON/DELIVERY POINT
Appendage
MATCH CODE
Appendage
MATCH CODE
ZIP PLUS FOUR CODE (4 DIGITS)
ZIP+4 MATCH LEVEL
ADDRESS DSF GROUP CODE
USPS DELIVERY SERVICE TYPE
CARRIER ROUTE CODE
DELIVERY POINT
1990 CENSUS CODES
ADDRESS LOCATION TYPE
LOCATION (DWELLING UNIT) ID
ADDRESS TYPE
ROUTE TYPE
ROUTE NUMBER
BOX TYPE
BOX NUMBER
UNIT TYPE
UNIT NUMBER.

Continuing to refer to FIG. 3, other data may be appended to these addresses (block 50). Other data may include information from warm address files comprising high risk addresses like mail receiving agents, jails, prisons, hotels and the like (block 58). Warm address file components may include:

| Warm Address File Components | |
| --- | --- |
| Address type: | Street directional |
| Mail receiving agent | Street name |
| Other high risk | Unit number |
| Hotel/Motel | City name |
| Street number | State Name |
| | Zip Code plus 4 |

Usually, an attempt is made to match the address to an address in the warm address file. If there is a match, then in one embodiment, the type (e.g., a description on the place where the mail would be delivered such as a prison) of address would be appended.

Other data may include non-client fraud address files comprising third party sourced fraud address records (block 60). Other data may further include Department of Justice county level crime statistics that scale the geographic propensity to crime frequency. Other similar information may be appended to the addresses. This information may be search to match an address, and append the information if there is a match.

Figure 5:
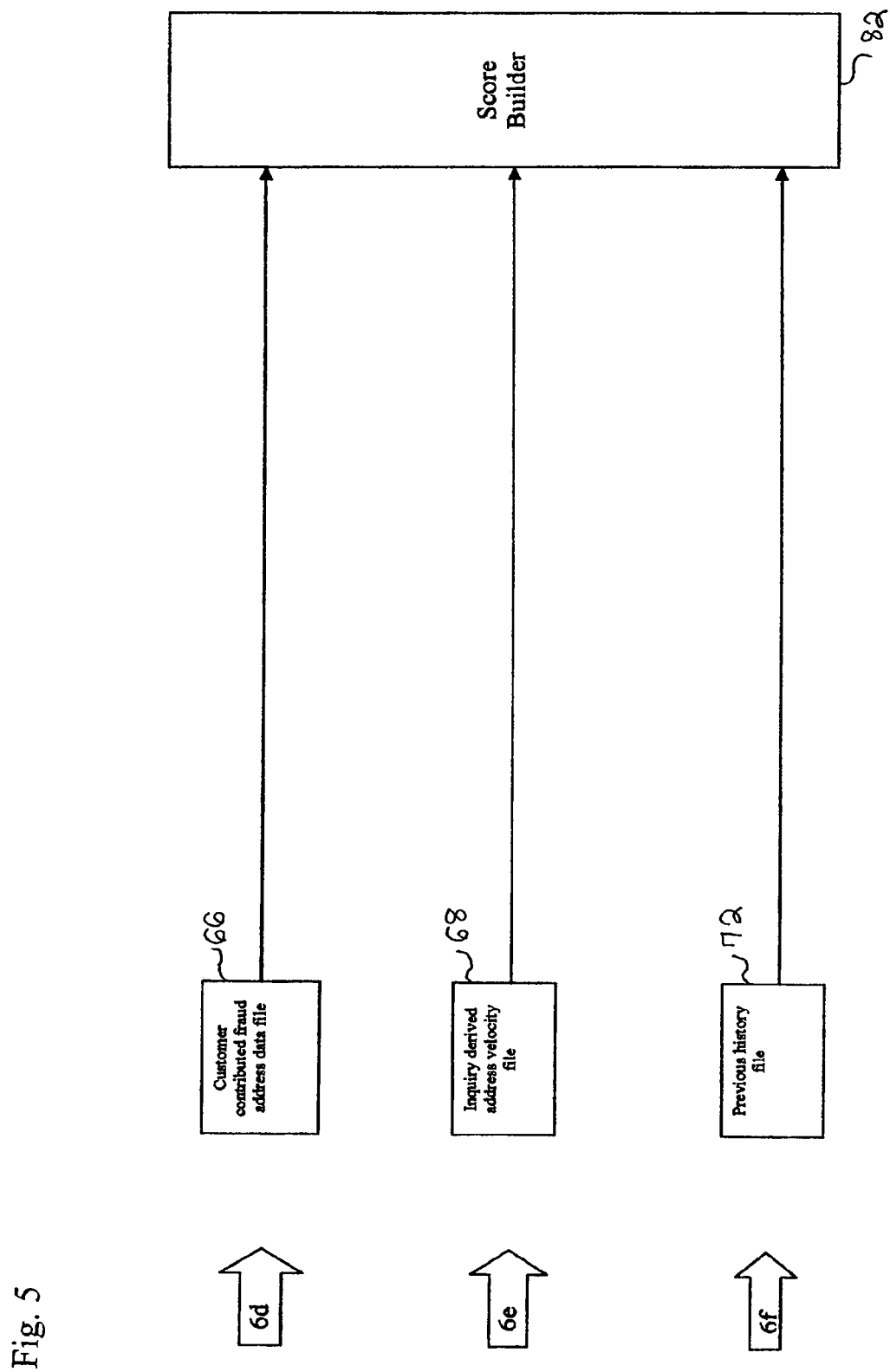

Also, as shown in FIGS. 2 and 5, any data from a client fraud file may be appended to the addresses (block 70). This data may be contributed by the business making the request (block 66). That is, the business provides fraud address data records. An example of such a record is as follows:

| Customer/Business Maintained Fraud/High Risk Address File | |
| --- | --- |
| First name | Street name |
| Middle initial/name | Unit number |
| Last name | City name |
| Surname | State Name |
| Street number | Zip Code plus 4 |
| Street directional | |

These records may be from on-line case management system that have stored accessible addresses for confirmed fraud incidents. This information will be used in the process for determining a risk of fraud, which may be indicated by a score.

Also, information is derived relating to inquiry activity relating to both new address and the reference addresses. This information is stored and updated in an address velocity file. Information is appended to the addresses relating to frequency of inquiries. (block 80). Also, a previous history file is reviewed for information relating to the new application and reference addresses. This information may be appended to the addresses (block 60). This previous history file includes previously scored addresses. This file may include date of scoring, address scored, and the score. This file may be updated to reflect any scoring performed on an address. False positive rates are improved through the use of warm address data, customer maintained known fraud address file coupled with the U.S. Postal Service National Change of Address Database: These data sources will be used in the score development process.

As shown in FIG. 2, once information has been appended to the addresses, then a score is created based on all the data (block 82). Generally, statistical models are used to derive a score, which is used to predict the risk of fraud. At block 82, a score is created based on the data associated with the request and the appended data. FIG. 6a shows the logical operations for determining a score in accordance with one embodiment of the present embodiment. As shown is FIG. 6a, as shown in block 180, the first step is to analyze the demographic data appended to each of the addresses and derive information used to predict the risk of fraud. Next, as shown in block 182, a score is calculated based on the weights placed for each of the selected variables. In one embodiment of the present invention the following variables have been selected to be used in the model to predict the risk of fraud: (1) a variable that is based on the change in the financial make-up of the two addresses; (2) a variable that identifies records that were confirmed through third party data to match the name at a given address; (3) a variable that is based on the home value between the two addresses; (4) a variable that is based on the distance of the move for the change of address; (5) a variable that is based on whether the type of housing (e.g., apartment, non-apartment, single family home) has changed for the current address in comparison with the reference address or old address; (6) a variable that is based on whether the application address or the new address is a building (i.e., not an apartment or a home, rather something other than an apartment or a home); (7) a variable based on whether the new application address, the new address or current address is a warm address; (8) a variable that is based on the difference in internet usages for the Zipcode+4 area for the two addresses; and (9) a variable that is based on the average length of stay at the residence at the Zip+4 area code for the reference address or the old address (when there is an address change requested). Then, the second step is to use the model to obtain a score to predict the risk of fraud. Each of these variables will be discussed in turn.

The first variable is based on the change in the financial make-up of the two addresses. In one embodiment of this model, this variable is called "Value1." This variable analyzes the change in the financial make-up of the reference address, the old address (e.g., in address change or account takeover situations), or FROM address (e.g., old address) and new application address, the new address, or the TO address (e.g., the address to which it has been changed). It is a composite of three demographic variables: Income, Net Worth and Home Ownership. In one embodiment, to derive the composite information the following steps are used. First, the difference in income is determined. As described with respect to FIG. 6b, to determine the difference in income, for both addresses (e.g., new application address and reference address in risk of fraud relating to a new application or as will be described later, reference or old and new addresses in a takeover situation), income for the respective address is appended by matching name and address to the appropriate demographic file. If there is not a match by both name and address, then a search is made to match at by address only to find income. If there is not a match by address only, then the Zip+4 for an address is used and the average income for that Zip+4 is appended to the address. If there is still not a match, then the mean income for all individuals is assigned. For instance, the mean income for all individuals may be assigned, when a Zip+4 for a particular address cannot be determined or when demographic data cannot be located for the address of a Zip+4 area.

Once, a value has been appended to each address for income, then the difference in income between the two addresses is calculated using the following formula:

$$DF\_INCOME=INCOME(FROM)-INCOME(TO)$$

Where DF_INCOME refers to the difference in income between the two addresses, INCOME(FROM) refers income appended to the reference address or old address, and INCOME(TO) refers to income appended to new application address or the new address.

Next, the difference in net worth ranking is constructed. To determine the difference in net worth, for both addresses, net worth ranking is appended by first trying to match by name and address to the demographic file. If a match is not found, then match by address only is attempted to find net worth ranking. If there is still no match, then a match is made to the Zip+4 of the address and the average net worth ranking for that Zip+4 is appended. If there is still no match, then the mean net worth ranking for all individuals is appended to the address. For instance, as with income, the mean net work ranking for all individuals may be appended when a Zip+4 for a particular address cannot be determined or when demographic data cannot be located for the address of a Zip+4 area.

Once, a net worth value has been appended for both addresses, then the difference in net worth between the two addresses is calculated as follows:

$$DF\_NETWR=NETWR(FROM)-NETWR(TO)$$

DF_ NETWR refers to the difference in net worth. NETWR(FROM) refers to the net worth of the reference address or old address and NETWR(TO) refers to the net worth of the new application address or the new address.

Next, the difference in homeownership is constructed. In order to determine the difference in homeownership, for both addresses, a homeowner indicator is appended to both addresses by matching name and address to the appropriate demographic file. If there is not match, then a homeowner indicator is appended by matching by address only to find homeowner indicator. If there is still no match, the average homeownership percentage for that Zip+4 is appended. If there is still no match, the mean homeowner percentage for all individuals is assigned. For instance, as with income, the mean homeowner percentage for all individuals may be appended, when a Zip+4 for a particular address cannot be determined or when demographic data cannot be located for the address of a Zip+4 area.

Once, we have a value for both the FROM and TO address, we then calculate the difference between the FROM and TO address as follows:

$$DF\_HOMEON=HOMEON(FROM)-HOMEON(TO)$$

Where DF_HOMEON refers to the difference in homeownership, HOMEON(FROM) refers to homeownership for reference address or old address, and HOMEON(TO) refers to homeownership for the new application address or new address.

Once the three difference for the income, net worth and homeownership have been calculated, then a variable that is a combination of the three is created:

IF DF_HOMEON<=-1,
THEN VALUE1=0.00056
IF DF_HOMEON>-1 and DF_HOMEON<=0
AND DF_NETWR<=-4.7
THEN VALUE1=0.00701
IF DF_HOMEON>-1 and DF_HOMEON<=0
AND DF_NETWR>-4.7 and DF_NETWR<=-2.7
THEN VALUE1=0.00131
IF DF_HOMEON>-1 and DF_HOMEON<=0
AND DF_NETWR>-2.7 and DF_NETWR<=-1.7
THEN VALUE1=0.00191
IF DF_HOMEON>-1 and DF_HOMEON<=0
AND DF_NETWR>-1.7 and DF_NETWR<=-0.7
AND DF_INCOM<=-11,000
THEN VALUE1=0.00056
IF DF_HOMEON>-1 and DF_HOMEON<=0
AND DF_NETWR>-1.7 and DF_NETWR<=-0.7
AND DF_INCOM>-11,000
THEN VALUE1=0.00565
IF DF_HOMEON>-1 and DF_HOMEON<=0
AND DF_NETWR>-0.7 and DF_NETWR<=0.3
THEN VALUE1=0.00066
IF DF_HOMEON>-1 and DF_HOMEON<=0
AND DF_NETWR>0.3 and DF_NETWR<=2.3
THEN VALUE1=0.00131
IF DF_HOMEON>-1 and DF_HOMEON<=0
AND DF_NETWR>2.3
THEN VALUE1=0.00297
IF DF_HOMEON>0
AND DF_NETWR<=5.3
THEN VALUE1=0.01894

```
IF DF_HOMEON>0
   AND DF_NETWR>5.3
   AND DF_INCOM<=37,000
   THEN VALUE1=0.00275
IF DF_HOMEON>0
   AND DF_NETWR>5.3
   AND DF_INCOM>37,000
   THEN VALUE1=0.01095
```

The numerical values are derived from a statistical analysis using known methods of actual identity theft fraud data, which was used to build this model.

The next variable identifies records that were confirmed through third party data to match the name at a given address. This variable is titled "MATCH." If a match is found to the third party database (demographics) via name and address, this variable is coded as a value of 1. If it is not confirmed, it is coded as a 0.

The next variable is based on the home value between the two addresses. To determine the value for this variable an analysis of the change in the home value is performed. This variable is named "DF_HOMVL." In one embodiment, the difference between the home value of the FROM address (e.g., reference address in a new application situation or the old address in takeover situations) and the TO address (e.g., the new application address in a new application or a new address in takeover situations). For both the FROM and TO address, a home value is appended by matching by name and address to the appropriate demographic file. If there is not a match, then the home value is appended based on a match by address only. If there is still no match, then the average home value for that Zip+4 of the address is appended. If there is still no match, then the mean home value for all individuals is appended. Once, we have a value for home value for both the FROM and TO address, we calculate the difference between the FROM and TO address as follows:

$$DF\_HOMVL=HOMEVAL(FROM)-HOMEVAL(TO)$$

Where DF_ HOMVL is the difference in home value, HOMEVAL(FROM) refers to the home value of the address prior in time to the one reflected as the address in a new application or in a change of address, and HOMEVAL(TO) refers to the address on the new application form as the current address or the new address provided in changing the address.

The next variable in the model is based on the distance of the move for the change of address. This variable is named "DF_DISTN." In one embodiment, this variable measures the distance of the move for the change of address. Using the delivery point for both the FROM and TO address, we then determine the longitude and latitude of the delivery point. We then calculate the distance of the move as follows:

$$DF\_DISTX=69.1*[TO(Latitude)-FROM(Latitude)]$$

$$DF\_DISTY=69.1*[TO(Longitude)-FROM(longitude)]*COS\ [FROM(latitude)/57.3]$$

$$DF\_DISTN=SQRTRDF[DF\_DISTX*DF\_DISTX]+(DF\_DISTY*DF\_DISTY)]$$

Where DF_DISTX refers to the change in latitude from the TO and FROM addresses multiplied by 69.1, DF_ DISTY refers to the change in longitude from the TO and FROM addresses multiplied by the cos of the latituted of the FROM address divided by 57.3, all of which is multiplied by 69.1, and DF_DISTN is calculated by the square root of the sum of the squares of DF_DISTX and DF_DISTY. The mathematical calculation is a known formula for converting latitudinal and longitudinal information into a distance.

The next variable is based on whether the type of housing (e.g., apartment, non-apartment, single family home) has changed for the current address in comparison with the reference address or old address. This variable is called "HOMAPT." In one embodiment, this variable indicates whether or not a person has moved from a non-apartment to an apartment. In one embodiment, if the FROM address is not an apartment and the TO address is an apartment, this variable is coded as a 1. Otherwise this variable is coded as a 0.

The next variable is based on whether the new application address or the new address is a building. This variable is named "BLDNG." This variable indicates whether or not the TO address is a building. In the model, If the TO Address is a Building, this variable is coded as a 1. Otherwise this variable is coded as a 0.

The next variable is based on whether the new application address, the new address or current address is a warm address. In short, this variable indicates if the second address is "warm". Warm addresses are addresses that are non-standard delivery addresses. This type of address includes addresses such as UPS Stores, Mail Boxes, Etc., hotels/motels, etc. The variable is named "WARMADD." In the model, if a match is made by TO the address to the Warm Address file, this variable is coded as a 1. Otherwise this variable is coded as a 0.

The next variable is based on the difference in internet usages for the Zipcode+4 area (sometimes also referred to as Zip+4) for the two addresses. In one embodiment, this variable measures the difference in internet usage for the area defined by Zip+4 for the FROM address to the area defined by the Zip+4 for the TO address. This variable is named "Z4_WEB." In one embodiment, this information is derived as follows. First, the average internet usage is calculated for the Zip+4 area for both the FROM address and the TO address. This data is resident on the demographic file, where a value of 1 indicates lowest likelihood of internet usage and 9 indicates the highest. Then, the average value for all addresses in the specific Zip+4 area is calculated. Once the value for each the FROM and TO addresses is determined, the difference variable is coded as follows:

$$Z4\_WEB=WEBUSE(FROM)-WEBUSE(TO)$$

Where Z4_WEB refers to the difference is web usages for the area defined by the Zip+4 for each of the addresses, WEBUSE(FROM) refers to the average internet usage for area defined by the Zip+4 for the FROM address (e.g., the reference address in a new application situation or the old address in a takeover situation), and WEBUSE(TO) refers to the average internet usage for the Zip+4 for the area defined by the TO address (e.g., the new application address or the new address in the takeover situation). While average internet usage is used as the measure, other measures such as median internet usage may be used in the appropriate model.

The last variable used in this embodiment of the model is based on the average length of stay at the residence at the Zip+4 area code for the reference address or the old address (when there is an address change requested). This variable is named "Z4_LORF." In one embodiment, this variable measures the average length of residence for the area defined by the Zip+4 for the FROM address. In one embodiment, this information is derived as follows. First, the average length of residence for the area defined by the Zip+4 is calculated for the FROM address. This data is resident on the demographic file, where the values indicate the number of years a person has resided at that residence. Then, the average value for all addresses in that Zip+4 area is calculated. The variable then indicates the average length of residence for people living in the area defined by theZip+4 for the FROM address.

In one embodiment, the model used to predict has nine variables. However, the model used to predict may have any number of variables. Also, the variables used may evolve based on information collected on the characteristics of confirmed fraud accounts. Another factor that may change the variables used relates to the evolution of methods used by the people committing the fraud. As the methods change, the variables may have to be varied. However, the present invention is not limited to the number of factors used on the types of factor used in the model to predict the risk of identity theft fraud.

Once the variables have been analyzed, the values for each of the variables are plugged into the model. The basic formula for the model is generalized as follows:

$$Y = A + B1*x1 + B2*x2 + B3*x3 \ldots + Bn*xn,$$

Where Y is the dependent or outcome variable is the result used to predict the risk of identity theft fraud, A is a constant value, B1 . . . Bn are the coefficients or weights assigned to the independent variables, and x1 . . . xn are the independent variables themselves. In the embodiment described above, the independent variables include VALUE1, MATCH, DF_HOMVLDF_DISTN, HOMAPT, BLDNG, WARMADD, Z4WEB, and Z4_LORF.

Using known statistical methods to analyze actual data from confirmed identity theft fraud cases, the following coefficients were determined for the model:

COMPUTE SCORE =

$0.001554 + VALUE1 * 0.93061 + MATCH * -0.00594 +$ $DF\_HOMVL * 2.12E - 09 + DF\_DISTN * 1.53E -$ $06 + HOMEAPT * 0.002093 + BLDNG * 0.002334 +$ $WARMADD * 0.078844 + Z4\_WEB * -0.00021 + Z4\_LORF * 0.000134$

Where COMPUTE SCORE refers to the score that will be used, at least in part, to predict a risk of identity fraud. In this method, the coefficients were determined using ordinary least squares regression. However, other known statistical methods such as logistic regression, CHAID, CART, discriminant analysis, neural networks or the like may be used.

In one embodiment the score is between 0 and 1 with 1 being most likely to be fraud. However, the scale may be any range. For instance, the score may be in a range of 1 to 100. Similarly, the score may be converted to a description. So depending on the risk tolerance of the institution making the inquiry, ranges may be provided that would indicate likelihood of identity theft fraud. For instance, on a scale of 0 to 1, a 0.8 or above may be designated as a high risk for fraud and the report to the company making the inquiry may be a descriptive assessment based on a numerical score rather than the score itself. The score itself shows some level of risk of identity theft fraud. Whether the level of risk is acceptable is one that must include input from the business as to its tolerance of this risk. Also, while the score itself may be used to predict whether identity theft is being perpetrated, the score may be used with other data such as, without limitation, warm address files, undeliverable mail addresses, syntax of the drivers license for a particular state to assess a risk of fraud, or the year the social security number was issued is compared to the date of birth for rationality.

The model described for determining a score was developed using confirmed identify theft fraud data. However, while the variables selected are based on an analysis of this confirmed fraud data, other variables may be selected. Because the model described herein is based on a statistical analysis of confirmed fraud data, the model takes what is known about the past and applies it to future events. Over time, however, behaviors and relationships change. This is especially true in the area of identity theft fraud. As fraud models and tools are effectively deployed, the fraud migrates, creating new behaviors and relationships. Because of this, the model may be modified by using the same methods described herein to emphasize certain variables or add other variables from the information sources described herein. The model described herein was tested to understand how well the model "performs" or segments the entire population of applications. The effectiveness of the model described here is shown by the segmentation table and the ROC curve.

In developing the model, the confirmed fraud data is scored. The scored data was categorized into equal sized buckets or categories from lowest to highest. Thus, the identity theft fraud rate present within each bucket is shown by categorizing the worst 5% into the first bucket, the next worst 5% into the second bucket, etc. The following chart shows the performance of the model.

| Segment | Percent Of Cases | Indexed Fraud Rate |
|---|---|---|
| 1 | 5% | 908 |
| 2 | 5% | 279 |
| 3 | 5% | 301 |
| 4 | 5% | 93 |
| 5 | 5% | 88 |
| 6 | 5% | 88 |
| 7 | 5% | 76 |
| 8 | 5% | 59 |
| 9 | 5% | 42 |
| 10 | 5% | 17 |
| 11 | 5% | 21 |
| 12 | 5% | 4 |
| 13 | 5% | 8 |
| 14 | 5% | 0 |
| 15 | 5% | 8 |
| 16 | 5% | 4 |
| 17 | 5% | 0 |
| 18 | 5% | 0 |
| 19 | 5% | 0 |
| 20 | 5% | 0 |
| TOTAL | 100% | 100 |

In this example, segment 1 is the worst 5% of scored records from the test data set. As shown by the chart, this segment has a fraud rate that is over 9 times the average fraud rate for the entire population. (Note: the Indexed fraud rate is calculated by taking the segment level fraud rate divided by the overall population fraud rate*100.)

Another way to look at the performance of the model is to look at a Power of Segmentation summary chart (FIG. 6b). This is sometimes also referred to as a ROC curve or Lorenz Diagram. This view shows how many cumulative fraud records are identified for each level of screening.

For example, this curve indicates that the model is able to identify approximately 60% of the total frauds (y-axis) by only looking at the worst 10% of records as identified by the model (x-axis). Similarly, the curve shows that the worst 5% account for approximately 45% of the total fraud. The top line shows how well the model performs, whereas the lower line shows how a randomly generated model performs (i.e., If one looked at 10% of the records, one would expect to identify about 10% of the fraud.)

Going back to FIG. 2, after the score is determined, at block 84, the address velocity file is updated with the score. Next, at block 86, apply business rules to the data. This business rules are to ensure that regardless of the score, certain data elements are checked (e.g., whether the address is a warm address, whether the address is a undeliverable mail address, whether social security number is valid etc.) That is, create a file on this analyzed case and include in that data relating to whether a warm address was present, whether it was a reported fraud address, or whether the address was an undeliverable mailing address. Such information may be used in analysis of other inquiries in the future. Moreover, regardless of the score, if the new address or the address on an application is a warm address, then the rule may be to report that as a high risk of identity theft.

Also, regardless of the fraud risk information, data relating to undeliverable mailing addresses would be useful information for the customer making the inquiry because sending media (e.g., checks, credit cards or the like) to an undeliverable providing address is expense to the business and creates a risk for fraud to be committed. As such, the customer making the inquiry that the address is an undeliverable mailing address would be useful to the customer and would save the customer the expense of mailing media to an undeliverable mailing address. Also, by not mailing media to an undeliverable address, the customer would reduce the risk of fraud being committed with the media.

Next, at block 88, user defined parameters are applied. That is, the business making the request may have some criteria (e.g., verify syntax of the driver's license). Each may provide information related to score thresholds based on its tolerance for risk. Apply those requirements and append that information with the score and the other information discussed with respect to business rules to create an output for sharing with the business.

At block 90, fraud alerts may be created with reason codes and transmitted to the business entity through a user interface at block 92 or a web server at block 98. The reason codes may be based on user defined criteria or codes based on the variables used in the analysis or data considered in the analysis. At block 91, the previous history file for this account may also be updated. As shown in blocks 94 and 96, a case management system provides display screen functionality for the fraud alerts, management queuing functionality with operator and pending case tracking.

In terms of output to the customer who initiated the inquiry, in one embodiment, the output message content includes the following:

| Output Message Content | |
|---|---|
| Score | First name |
| One or more reason codes | Middle initial/name |
| Account or reference number | Last name |
| | Surname |

However, the output may be provided in a other ways. For instance, the output may be provided by simply stating a level of risk or providing a statement of the level of risk of fraud in addition to the score. Also, while the information related to the level of risk of fraud may be communicated via a data line, the interne, a facsimile or by voice (including an operator simply calling the customer with an oral report of the risk analysis).

Also, the web server (block 98) may be used by the customer to provide confirmed fraud data, which would be used to update the client fraud data file for future use.

In operation, the business/customer makes an inquiry to assess a level of risk of fraud on a new application. Data is appended to the address provided on the new application and the reference address (from a third party source such as a credit report or this information may be on the application). A score is derived using the model described above. The result may be provided real-time or via batch processing. In either case, the results maybe provided to the customer in any commercially practicable method including, but not limited to, a data line, the internet, a facsimile or by voice (electronic or human voice). Customers may establish internal policies and procedures for handling accounts based on the score.

Figure 8:
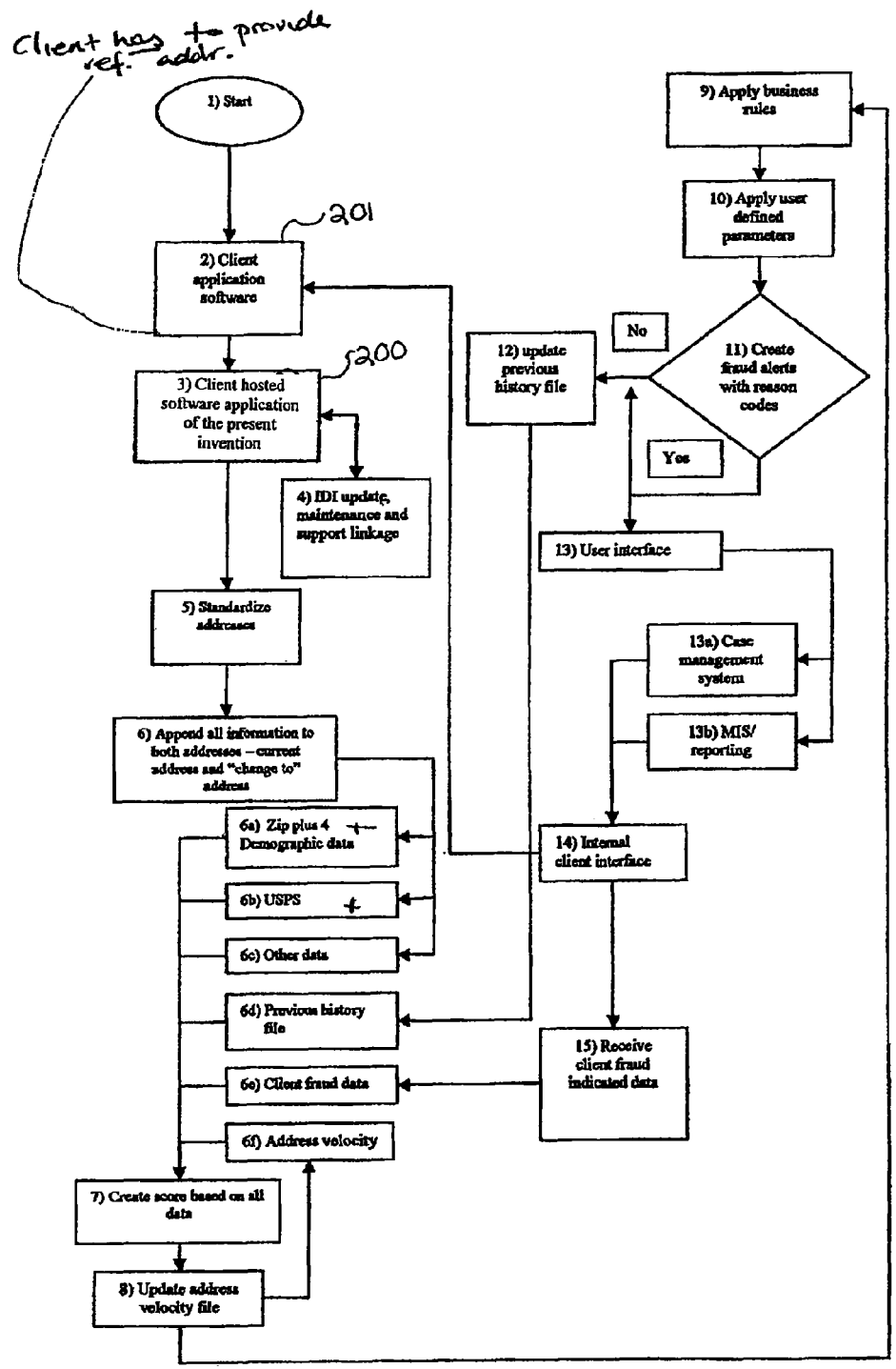
FIG. 8 illustrates another example for processing new account request, in accordance with an embodiment of the present invention.

The system described with reference to FIG. 2 is a client-server system. The client transmitted the request and input information to a remote server for processing. FIG. 8 shows the logical operations used in a system that is hosted at the client site. That is, the customer hosts the system for determining the risk of fraud in a new application process or on an account takeover situation.

As shown in FIG. 8, most of the logical operations are the same as the operations described in FIG. 2. However, one difference is that the client hosts the software to perform the analysis to create the score. Also, depending on the level of resources committed by the client may not access all the demographic data described in the process described with respect to FIG. 2. For instance, the client hosted solution may be limited to Zip code plus+4 data variables. As such, the model may not be as rigorous as the model as described with respect to FIG. 2. This type of system may be provide a risk analysis that while less rigorous useful in some situations.

FIGS. 8-15 show alternatives to the basic method described with respect to FIG. 2 for use in account takeover situations. That is, the basic logical operations of appending information to the addresses and calculating a score as described with references to FIGS. 2-6b would be used. As described with respect to FIG. 2, in determining fraud with respect to a new application the reference address is usually linked to the applicant's identity, not necessarily the address on the new application form. As described above, usually, in a new application situation, the reference address is obtained from a credit bureau. However, in the takeover situation, the old address or the FROM address would be the reference address and the address to which it is changed to is the new address (e.g., the TO address). A customer may want each change of address analyzed to determine a risk of fraud and match to subsequent media requests, a customer may want the change of address analyzed only when such a request is matched to a media request, or a client may want each change of address analyzed for risk of fraud. Each of these situations will be discussed in turn with reference to FIGS. 6b-13.

Figure 9:
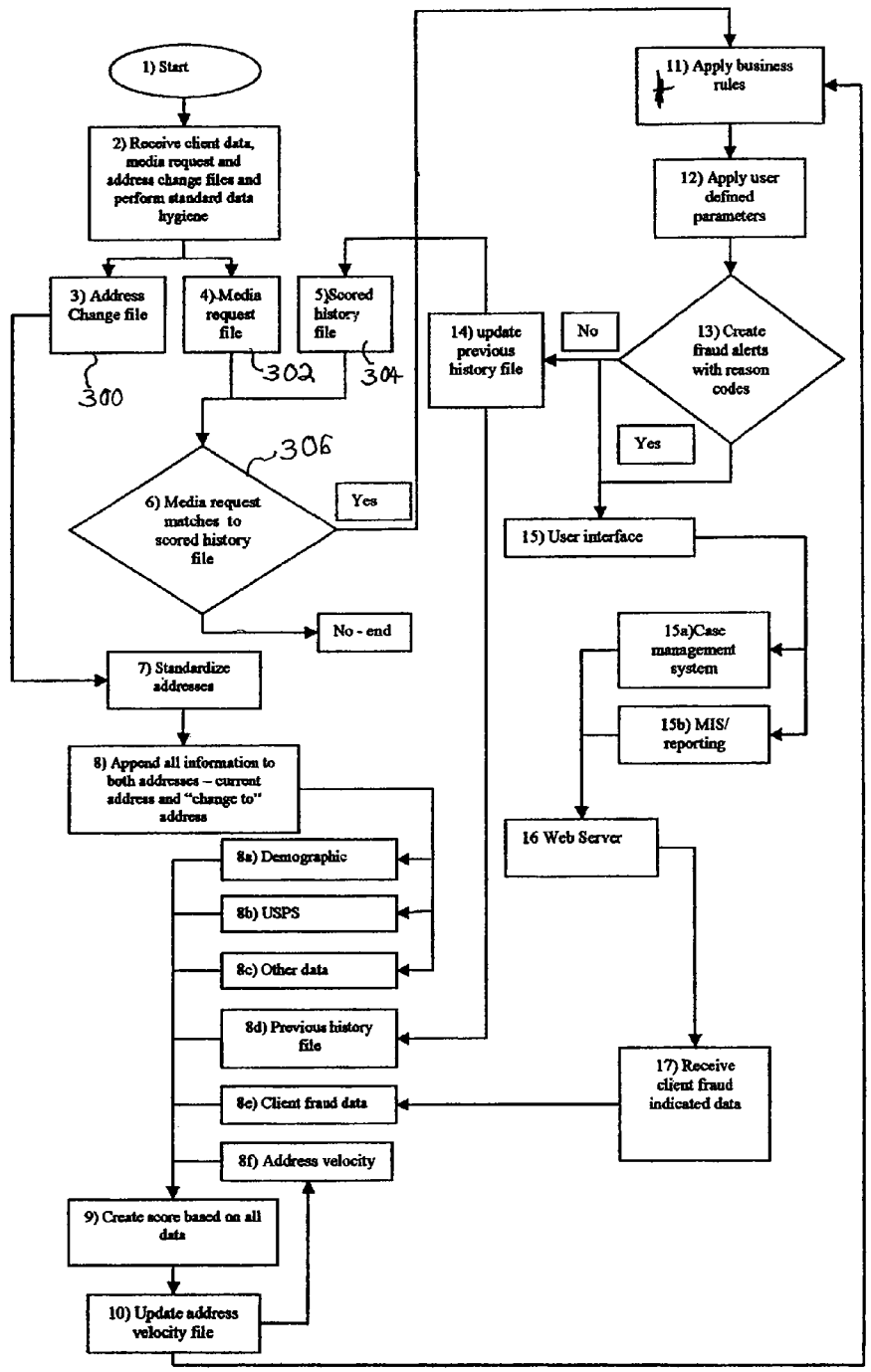
FIG. 9 illustrates an example of logical operations for processing requests to take over an account, in accordance with an embodiment of the present invention.
Figure 11:
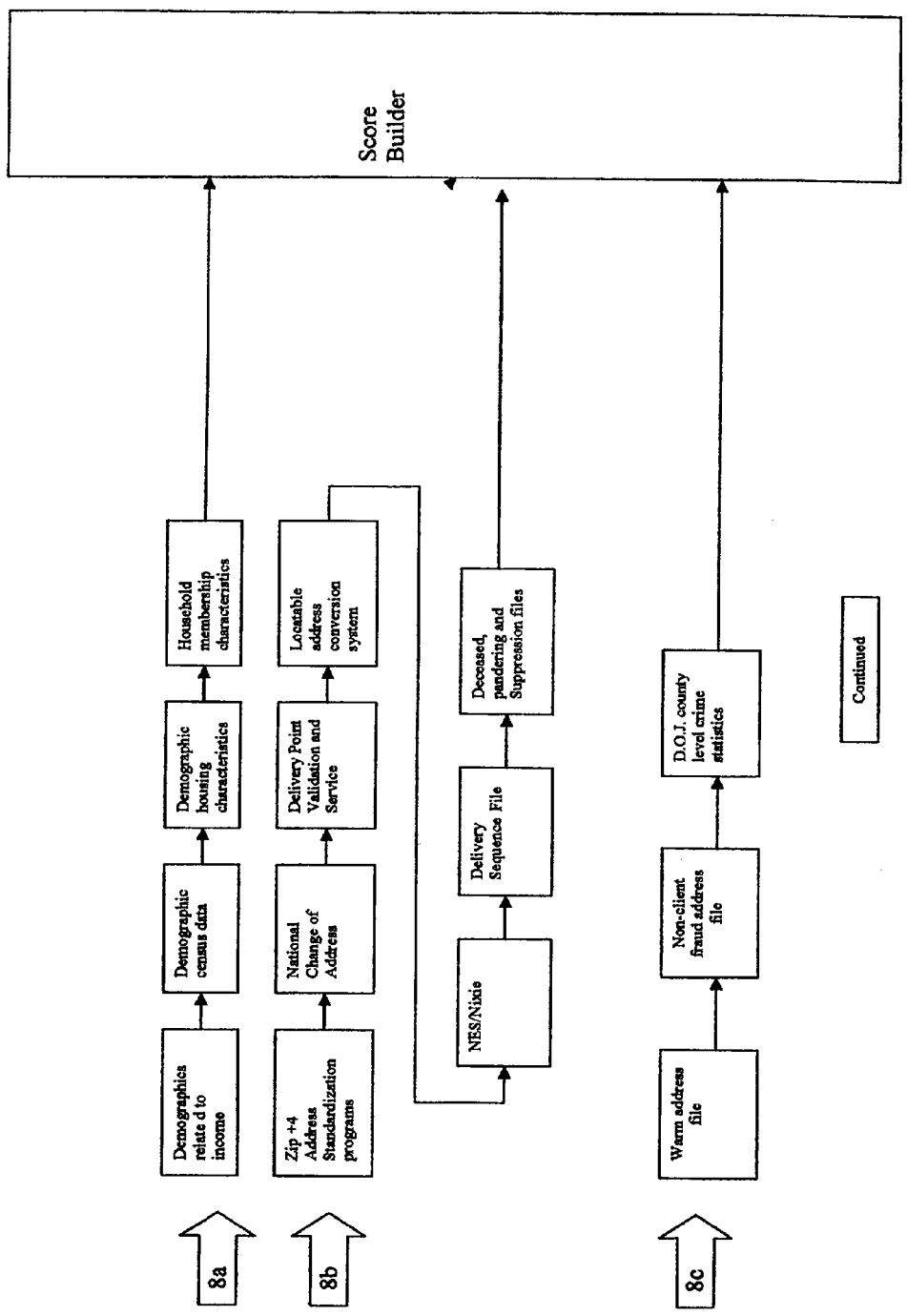
FIGS. 11-12 illustrate examples of operations of FIGS. 9-10, in accordance with an embodiment of the present invention.
Figure 12:
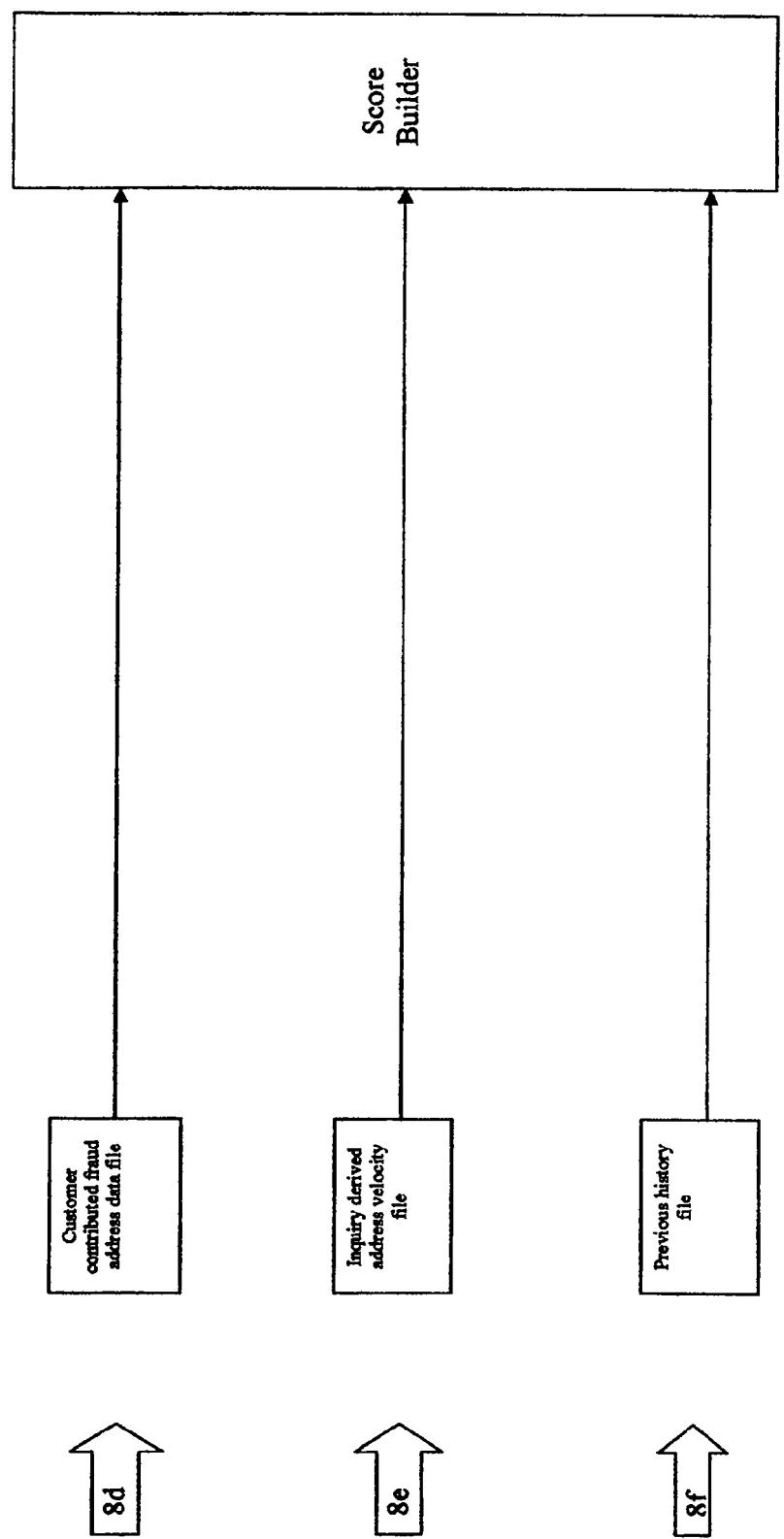

FIGS. 9, 11, and 12 show the logical operations for an embodiment in which an analysis is performed for each address change and a match is made for subsequent media requests. As shown in FIGS. 9, 11, and 12, the logical operations for analyzing the risk of fraud is the same as that described and shown in FIGS. 2-6b. That is, information is appended to the old address (the address before the change of address request)—which for takeover situation would be considered a reference address—and to the new address (i.e., the address it was changed to). Then, a score would be derived using the model described with reference to FIG. 6a. However, as shown in block 300, there is an address change file that maintains the change in address for a particular account. Also, as shown in block 302, a media request file is maintained. A media request may include a request for financial instruments such as checks or credit cards. In addition, as shown in block 304, a scored history file is maintained to store the score based on the analysis done (consistent with the analysis as described in FIG. 2) for an account in which there was a change in address. When a media request is made, it is checked against the scored history file. If there is a match in terms of an address change in the same account on which the media request is made, business rules—which may be supplied by the customer—are used to determine whether to honor the media request. Some factors that may be used include the time lapse between the media request and the address change and the risk of identity theft fraud as determined by the scoring.

Figure 10:
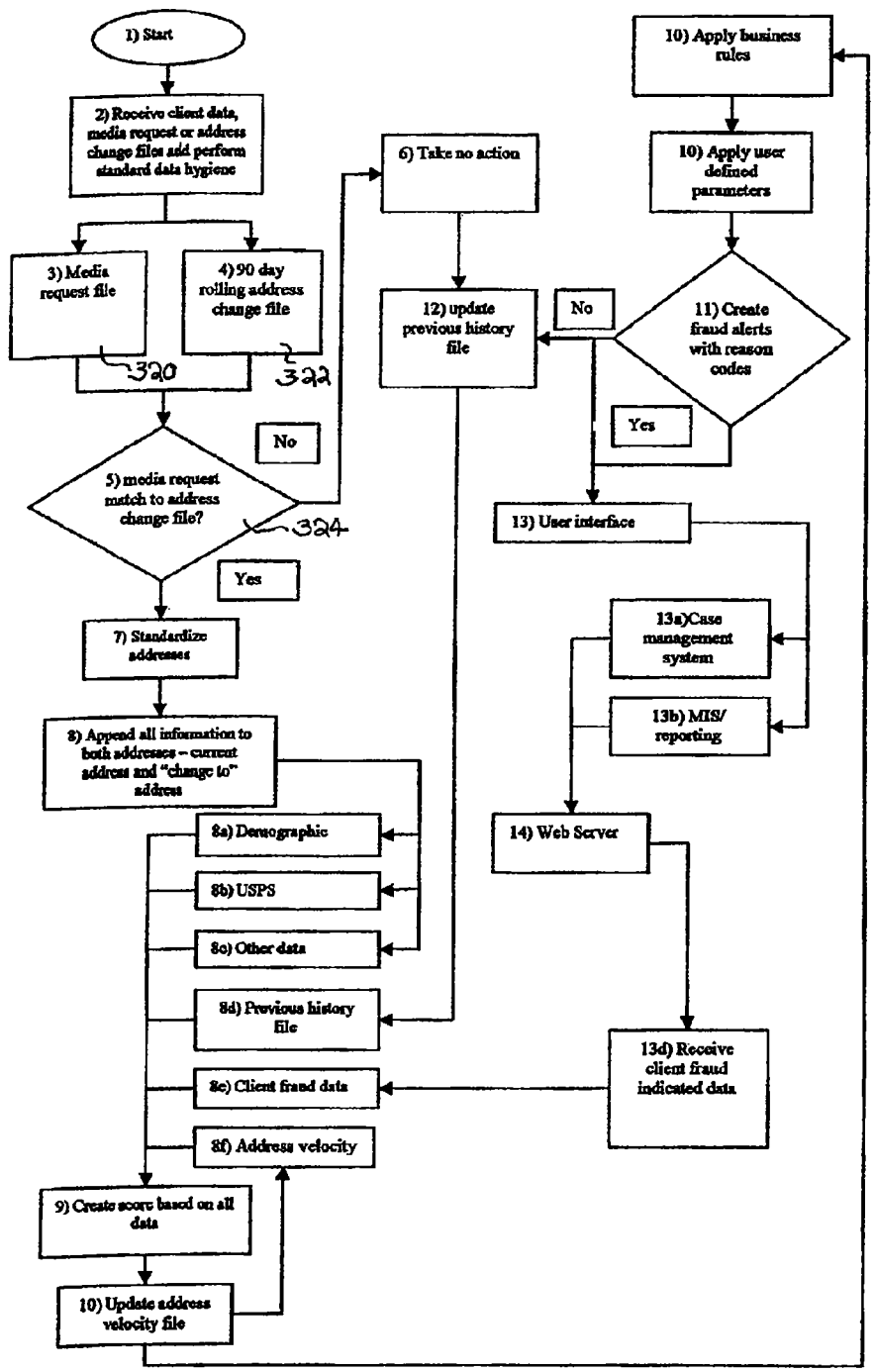
FIG. 10 illustrates another example of logical operations for processing a request to take over an account, in accordance with an embodiment of the present invention.

As shown in FIGS. 10, 11, and 12, customers may only want an address change analyzed for risk of fraud if it is followed with a media requested within a period of time of the address change. It should be noted that the media request may be prior to the address change request. In this situation, as shown in block 320, a media request file is maintained storing media request information on accounts. Also, as shown in block 322, a 90 day rolling address change file is maintained. While in one embodiment the rolling address change file has a 90 day window, the rolling address file is not limited to a 90 day window but rather may be constructed to any length of time. As shown in block 324, a determination is made as to whether a media request matches a change in address request. If so, then the analysis to score the change in address as described with respect to FIG. 2-6b is performed (as shown in FIGS. 10-12).

Figure 13:
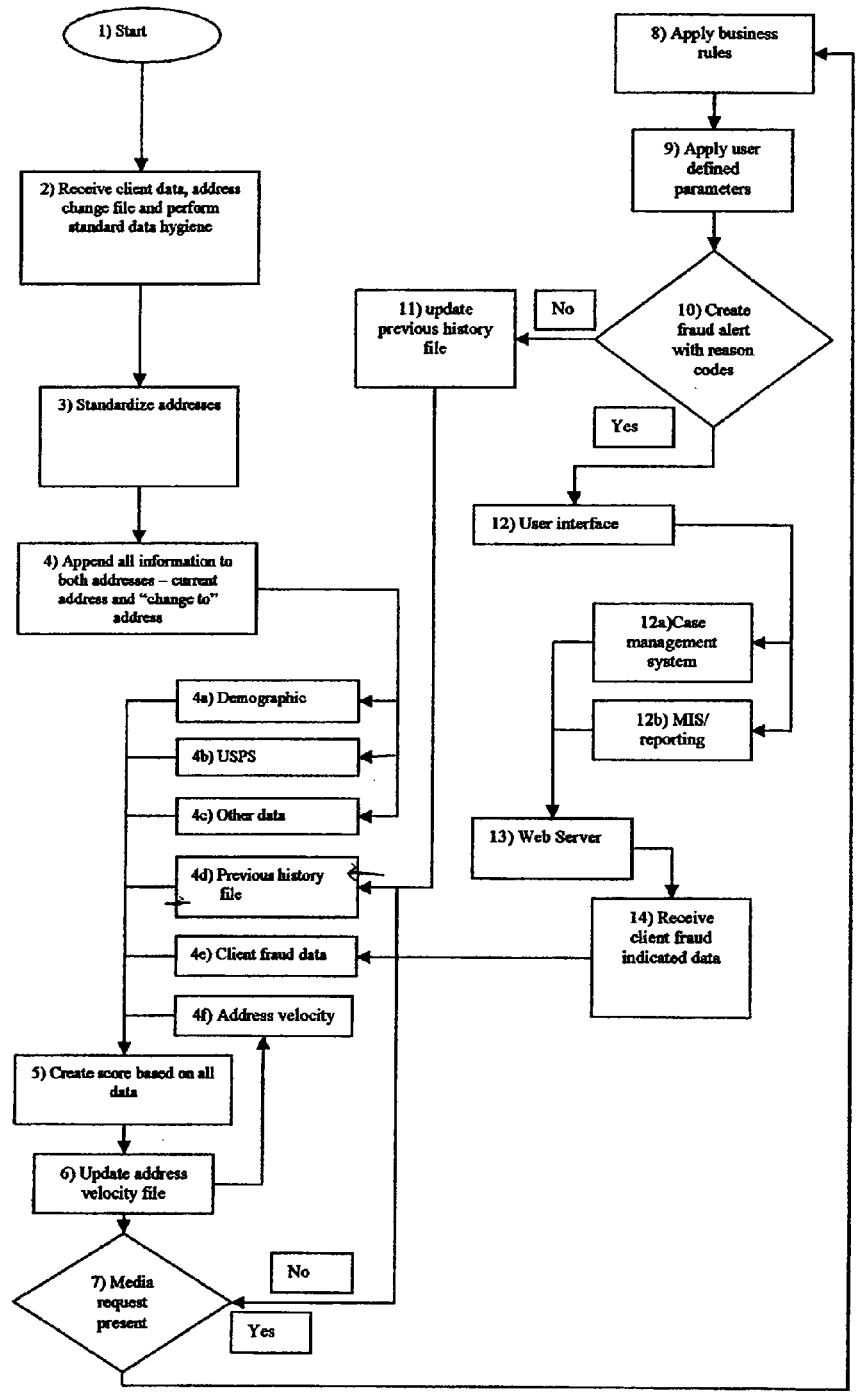
FIG. 13 illustrates another example of logical operations for processing a request to take over an account, in accordance with an embodiment of the present invention.
Figure 14:
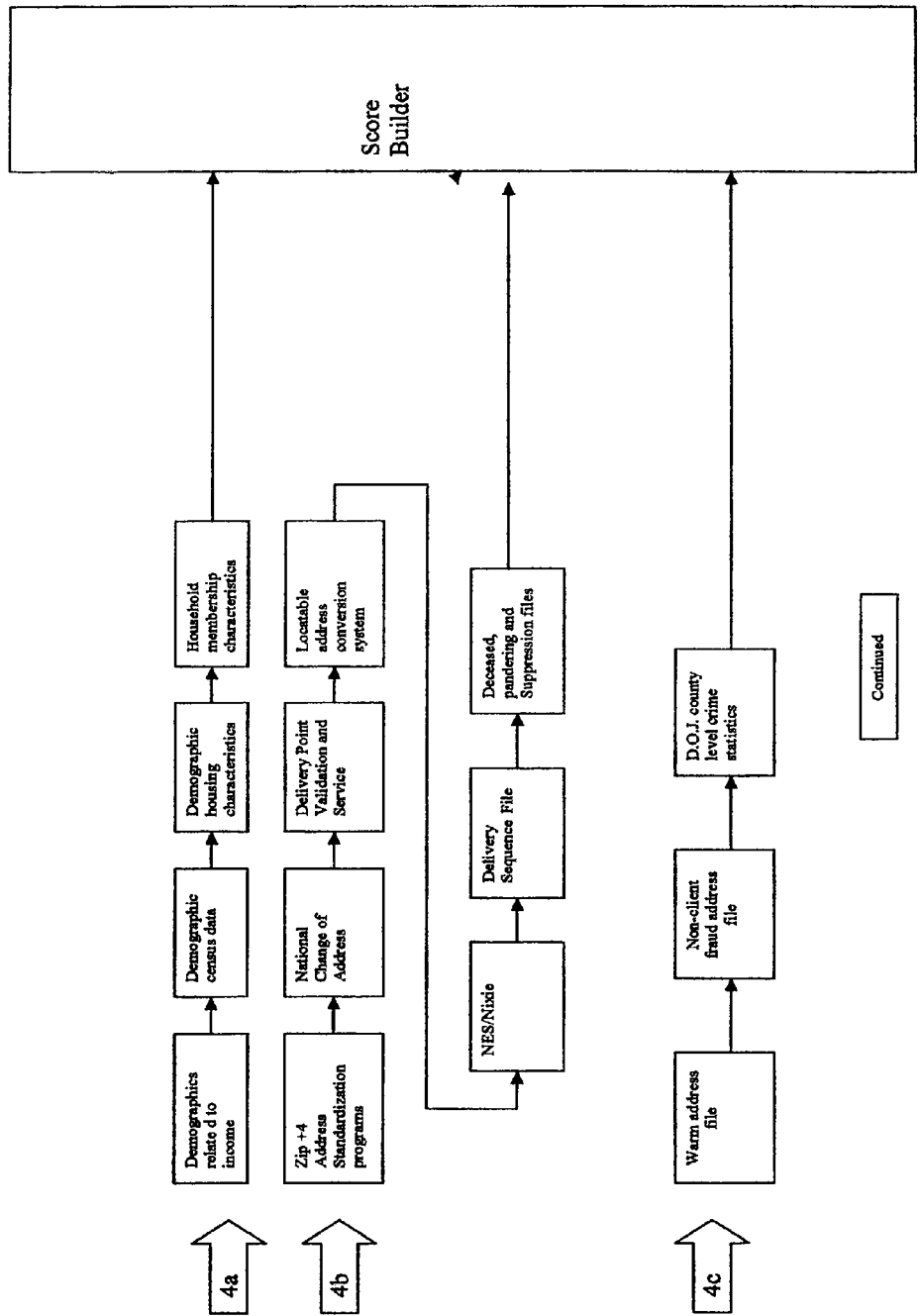
FIGS. 14-15 illustrate examples of logical operations for FIG. 13, in accordance with an embodiment of the present invention.
Figure 15:
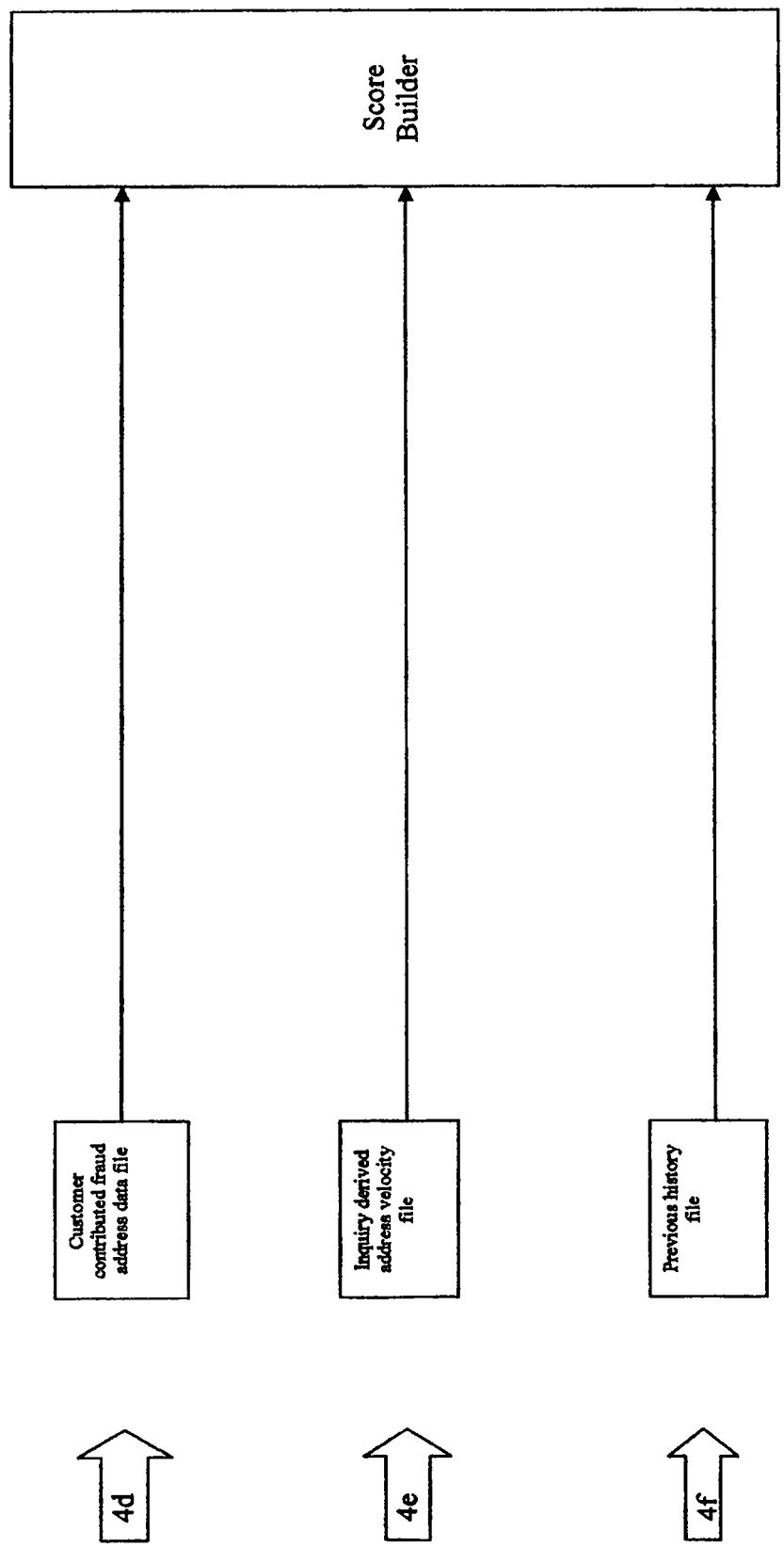

FIGS. 13-15 show the process described with respect to FIGS. 2-6b being applied in the case when each address change is scored, but no additional steps are performed with respect to media requests.

As with the process described with respect to new applications, a numerical score derived from this process may be used to assess risk. However, in other embodiments, the score may be considered along with data analyzed based on the business rules and client-defined parameters to make as assessment of the risk of identity theft. This information may be provided in any number of ways including voice, data line, facsimile. Also, the processing for takeover accounts may be done in batch, real-time, and in a client-server structure where the server is in a remote location or in a structure where the system is hosted at the client site.

There are several purpose for which this invention serves. A purpose of this invention is to prevent fraud losses associated with account takeover. An additional purpose of the invention is to prevent fraud losses that accrue from criminals submitting fraudulent credit account applications to financial institutions where the criminal assumes the credit identity of an unknowing person/victim. If the account is approved, the criminal receives the credit card, debit card, checks or merchandise or services at a street address other than that of the victim.

An additional purpose of this invention is to reduce fraud losses in a form of account takeover that is associated with "over night" emergency requests for the replacement of items such as credit/debit cards, personal checks, traveler check replacements. There is a business and competitive need for financial institutions to provide emergency replacement services. Criminals can affect an account take over by exploiting the Emergency replacement process through requesting that an unauthorized replacement be sent to an address for which they have access. The criminal receives the replacement and commits unauthorized use fraud. Emergency type credit and debit card replacements are often requested to be sent to an address other than the address of record. A financial institution has a short processing window to establish the legitimacy of these requests. This invention would help to identify potentially fraudulent requests using the analysis described above.

Another purpose of this invention is to reduce fraud losses where product or service fulfillment or billing activities involve a street address and the effects of fraudulent addresses that would be negative to business interests. This can occur in the retail environment particularly in non-face to face transactions. In addition to reduced direct fraud losses through superior detection, the purpose of this invention is to reduce overhead and infrastructure expenses associated with low false positive rates, reduced infrastructure expenses that are necessary to process fraudulent claims and an improved customer experience.

As can be seen by the above Figures, different factors may be considered depending upon the particular request that is received, and may be dynamically determined as to what factors should be considered for a given request. For instance, some requests may only utilize certain factors, while other requests may involve checks of all factors in providing a score.

Hence, it can be seen that embodiments of the present invention provide various systems and methods that can be used for detecting fraud in account requests.

Embodiments of the invention can be embodied in a computer program product. It will be understood that a computer program product including one or more features or operations of the present invention may be created in a computer usable medium (such as a CD-ROM or other medium) having computer readable code embodied therein. The computer usable medium preferably contains a number of computer readable program code devices configured to cause a computer to affect one or more of the various functions or operations herein described.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to embodiments thereof, it will be understood by those skilled in the art that various other changes in the form and details may be made without departing from the spirit and scope of the invention.

What is claimed is:

1. A computer-implemented method for assessing a level of risk of fraud, comprising:
   receiving as computer readable storage media at least information relating to a first address relating to one of an account holder or an applicant;
   receiving as computer readable storage media information relating to a second address;
   obtaining demographic data related to the first and second addresses;
   measuring demographic differences between the first and second addresses using computer executable instructions that include an algorithm for measuring the demographic differences; and
   providing a level of risk of fraud based upon the demographic differences.

2. The method of claim 1, further comprising analyzing whether the first address is a warm address.

3. The method of claim 1, further comprising analyzing whether the first address is an undeliverable mail address.

4. The method of claim 1, further comprising calculating a score indicative of a level of risk of identity theft fraud.

5. The method of claim 4, wherein calculating a score comprises using a mathematical model that includes weighting factors for one or more pre-defined variables used in the model.

6. A computer-implemented method for assessing a risk of identity theft fraud with respect to new applications, comprising:
   receiving as computer readable storage media first address information relating to an applicant for an account;
   obtaining demographic data relating to the address information;
   receiving a reference address;
   obtaining demographic data relating to a reference address;
   analyzing by comparing the demographic data relating to the address information and the reference address via computer executable instructions to determine a level of risk of identity theft fraud.

7. The method of claim 6, further comprising receiving a reference address.

8. The method of claim 6, wherein receiving a reference address includes receiving reference address information from a third party database.

9. The method of claim 6, wherein receiving a reference address includes receiving reference address information as part of input data provided in making a request to assess a risk of identity theft fraud.

10. The method of claim 6, further comprises measuring at least one difference in demographic data related to the first address and the reference address.

11. The method of claim 10, further comprising calculating a score indicative of a risk of identity theft.

12. The method of claim 11, further comprising reporting an assessment of a risk of identity theft based at least in part on the score.

13. The method of claim 12, further comprising providing negative data comprising data that is known to be associated with fraud or suspected to be associated with fraud and analyzing the negative data for the first address.

14. The method of claim 13, wherein the act of assessing risk of identity theft is based on the score and analysis of the negative data.

15. A computer-implemented method for assessing a risk of identity theft fraud, comprising:
   using obtained demographic attributes of street addresses to predict the risk of fraud via computer executable instructions, wherein using comprises analyzing differences between demographic attributes of the addresses.

16. The method of claim 15, further comprising reporting the predicted risk of fraud.

17. The method of claim 16, wherein assessing a risk of fraud comprises assessing the risk of identity theft fraud due to account takeover.

18. The method of claim 16, wherein assessing a risk of fraud comprises assessing the risk of identity theft fraud perpetrated through a new application.

19. The method of claim 17, further comprising receiving information relating to a media request.

20. The method of claim 19, further comprising assessing risk of identity theft when the request for media is made on an emergency basis.

21. The method of claim 15, wherein assessing risk of fraud comprises assessing a risk of identity theft in fulfillment activities.

22. The method of claim 15, further comprises coupling negative and positive information obtained from one or more databases with address demographic attributes to assess the risk of identity theft fraud.

23. A computer-implemented method for detecting a level of risk of identity theft fraud comprising:
   obtaining an address for evaluation;
   combining warm address information, known fraud address information, United States Postal Service Deliverable Address Files, National Change of Address Database files with address specific, single point, demographic information related to the obtained address; and
   coupling differential information relating to the obtained addresses via computer executable instructions to predict a risk of fraud for at least one of account takeover, new account application, and fulfillment fraud.

24. A system for assessing a risk of fraud, comprising:
   a processor;
   memory;
   computer instructions operable by the processor to append data to at least one variable used in assessing a risk of identity theft fraud;
   computer instructions operable by the processor to analyze differences in demographic data for two different street addresses;
   computer instructions operable by the processor to calculate a score indicative of a level of risk of fraud; and
   computer instructions operable by the processor to output an assessment of a risk of level of fraud.

25. The system of claim 24, wherein the computer instructions to calculate a score comprise instructions to calculate a score indicative of a risk of fraud using a formula of the form $$Y = A + B1^*x1 + B2^*x2 + B3^*x3 \ldots + Bn^*xn$$

where Y is the dependent or outcome variable is the result used to predict the risk of identity theft fraud, A is a constant value, B1 ... Bn are the coefficients or weights assigned to the independent variables, and x 1 ... xn are the independent variables.

26. A computer-implemented method for determining whether an account request for a change of address from an applicant involves fraud, comprising:
   receiving a request to change an address of an account, said request including an old address and a new address of the applicant;
   obtaining demographic data based on the old address of the applicant;
   obtaining demographic data based on the new address of the applicant;
   calculating a differential between the demographic data based on the old address of the applicant and the demographic data based on the new address of the applicant, the calculating being done via computer executable instructions; and
   calculating a score for the request based on the differential, the score indicating whether the request involves fraud.

27. A computer-implemented method for determining whether an account request from an applicant for media involves fraud, comprising:
   receiving a request to provide media to the applicant relating to an account;
   determining whether the account has information relating to change of addresses, said information including an old address and a new address of the applicant;
   obtaining demographic data based on the old address of the applicant;
   obtaining demographic data based on the new address of the applicant;
   calculating a differential between the demographic data based on the old address of the applicant and the demographic data based on the new address of the applicant, the calculating being done via computer executable instructions; and calculating a score for the request based on the differential, the score indicating whether the request for media involves fraud.

28. A computer-implemented method for determining whether an account request from an applicant for media involves fraud, comprising:

receiving a request to provide media to the applicant relating to an account, said request including a current address of the applicant and a shipping address to which to ship said media;

obtaining demographic data based on the current address of the applicant;

obtaining demographic data based on the shipping address of the applicant;

calculating a differential between the demographic data based on the current address of the applicant and the demographic data based on the shipping address of the applicant, the calculating being done via computer executable instructions; and calculating a score for the request based on the differential, the score indicating whether the request for media involves fraud.

29. A system for processing account requests from applicants, comprising:

one or more inputs for receiving account requests from one or more business entities, each of said account requests including an address of an applicant;

an interface for receiving or locating a reference address;

an interface for transmitting the address of the applicant and the reference address to an address data service to obtain demographic data therefrom; and a scoring module for calculating a score for the request based on comparing the demographic data for the applicant address and the reference address, the score indicating whether the request may involve fraud.

30. A computer-implemented method for providing information assessing a risk of fraud, comprising:

obtaining two different street addresses to be analyzed;

obtaining demographic data associated with the street addresses;

analyzing via computer executable instructions two different street addresses and demographic data associated with the street addresses;

based, at least in part on the analysis, providing an assessment of a risk of fraud.

31. The method of claim 30, wherein providing an assessment of a risk of fraud comprises providing a score and at least one reason for the score provided.

32. The method of claim 30, where providing an assessment of risk comprises sending the assessment via an electronic message.

33. The method of claim 30, wherein providing an assessment of risk comprises sending the assessment via voice.

* * * * *